US012579307B2

(12) United States Patent
Lee et al.

(10) Patent No.: US 12,579,307 B2
(45) Date of Patent: Mar. 17, 2026

(54) CONTROL OF DEBUG PORT ACCESS TO DATA IN A MEMORY DEVICE, OPERATING METHOD OF THE SAME, AND MEMORY SYSTEM

(71) Applicant: SAMSUNG ELECTRONICS CO., LTD., Suwon-si (KR)

(72) Inventors: Yongsuk Lee, Suwon-si (KR); Myeongjong Ju, Suwon-si (KR); Jisoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 18/539,799

(22) Filed: Dec. 14, 2023

(65) Prior Publication Data

US 2024/0202361 A1     Jun. 20, 2024

(30) Foreign Application Priority Data

Dec. 14, 2022     (KR) ........................ 10-2022-0174952

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01)

(58) Field of Classification Search
CPC .... G06F 21/6245; G06F 21/602; G06F 21/78; G06F 21/79; G06F 21/604; G06F 21/72; H04L 63/102
See application file for complete search history.

(56) References Cited

U.S. PATENT DOCUMENTS

| | | | | |
|---|---|---|---|---|
| 6,154,856 | A * | 11/2000 | Madduri | ............. G06F 11/3656 714/E11.21 |
| 6,175,914 | B1 * | 1/2001 | Mann | .................. G06F 11/3632 714/E11.212 |
| 6,189,140 | B1 * | 2/2001 | Madduri | ............. G06F 11/3698 714/E11.212 |
| 7,055,136 | B2 | 5/2006 | Dzoba et al. | |
| 7,103,782 | B1 * | 9/2006 | Tugenberg | .............. G06F 21/78 713/193 |
| 7,117,352 | B1 * | 10/2006 | Giles | ................ G01R 31/31719 713/2 |
| 7,363,564 | B2 | 4/2008 | Moss et al. | |
| 7,757,295 | B1 * | 7/2010 | Hadaaegh | ............. G06F 21/552 713/193 |
| 7,886,150 | B2 * | 2/2011 | Stollon | ................. H04L 9/0891 726/28 |

(Continued)

FOREIGN PATENT DOCUMENTS

JP          2014-48904 A     3/2014

*Primary Examiner* — Aravind K Moorthy
(74) *Attorney, Agent, or Firm* — Sughrue Mion, PLLC

(57) ABSTRACT

A memory device includes one or more non-volatile memories configured to store user data and at least one key related to the user data; a network-on-chip comprising a bus manager configured to manage access to the user data and the at least one key; and a debug port directly connected to a host and configured to receive a request from the host, wherein the bus manager is further configured to, based on the debug port being activated, determine whether to allow access of the host to the user data and the at least one key based on classification information.

19 Claims, 16 Drawing Sheets

10

```
    ┌200                                                              ┌100
    │              ┌150         ┌140                 ┌110
    │         ┌120  MEMORY       NOC         130      MEMORY
    │    ┌────┐ DR  CONTROLLER              ┌─────┐
HOST│    │DEBUG│◄──►│          │──►│        │◄─►│DATA │◄─►│
    │    │PORT │ Ctrl│   ┌151  │   │  ┌141  │  BUS│   │  ┌111
    │    └────┘     │SYSTEM│   │   │BUS   │   │   │ENCRYPTION│
    │              │CORE  │   │   │MANAGER│  │   │MODULE    │
    │              └──────┘   │   └───────┘  │   └──────────┘
```

(56)　　　　　　References Cited

U.S. PATENT DOCUMENTS

| | | | | |
|---|---|---|---|---|
| 7,908,590 | B1* | 3/2011 | Min | G06F 11/3684 |
| | | | | 717/124 |
| 8,090,108 | B2* | 1/2012 | Qureshi | G06F 21/85 |
| | | | | 380/239 |
| 8,108,691 | B2 | 1/2012 | Holtzman et al. | |
| 8,171,309 | B1* | 5/2012 | Poo | G06F 11/3648 |
| | | | | 713/192 |
| 8,510,716 | B1* | 8/2013 | Jakubiak | G06F 11/3672 |
| | | | | 714/45 |
| 8,549,368 | B1* | 10/2013 | Deogharia | G11C 29/48 |
| | | | | 714/733 |
| 8,738,935 | B1* | 5/2014 | Brooker | G06F 21/6218 |
| | | | | 713/193 |
| 9,152,505 | B1* | 10/2015 | Brooker | G06F 21/6218 |
| 9,606,175 | B2* | 3/2017 | Trethewey | G01R 31/3177 |
| 9,606,888 | B1* | 3/2017 | Wiesner | G06F 11/3698 |
| 9,959,192 | B1* | 5/2018 | Burriesci | G06F 11/362 |
| 10,061,718 | B2* | 8/2018 | Colp | G06F 21/78 |
| 10,318,723 | B1* | 6/2019 | Paczkowski | G06F 15/7825 |
| 10,430,225 | B1* | 10/2019 | Harland | G06F 9/45558 |
| 10,614,231 | B1* | 4/2020 | Dozer | G06F 21/602 |
| 11,243,893 | B2 | 2/2022 | Lutz et al. | |
| 11,280,829 | B1* | 3/2022 | Poolla | G01R 31/3177 |
| 11,500,748 | B1* | 11/2022 | Ofir | G06F 11/0772 |
| 2003/0212934 | A1* | 11/2003 | Bovitz | G11C 29/14 |
| | | | | 714/718 |
| 2004/0255199 | A1 | 12/2004 | Yamashita | |
| 2005/0047597 | A1* | 3/2005 | Zheng | H04L 9/14 |
| | | | | 380/247 |
| 2005/0216791 | A1* | 9/2005 | Liu | G06F 11/221 |
| | | | | 714/25 |
| 2006/0242696 | A1* | 10/2006 | Cruzado | G06F 21/71 |
| | | | | 726/16 |
| 2007/0043978 | A1* | 2/2007 | Cruzado | G06F 21/86 |
| | | | | 714/38.1 |
| 2007/0092082 | A1* | 4/2007 | Rush | G06F 21/10 |
| | | | | 380/277 |
| 2007/0094507 | A1* | 4/2007 | Rush | H04L 9/0897 |
| | | | | 713/176 |
| 2007/0237325 | A1* | 10/2007 | Gershowitz | G06F 21/72 |
| | | | | 380/30 |
| 2008/0109633 | A1* | 5/2008 | Yamakawa | G06F 11/3648 |
| | | | | 712/1 |
| 2008/0148343 | A1* | 6/2008 | Taniguchi | G06F 11/2236 |
| | | | | 714/E11.166 |
| 2009/0055647 | A1* | 2/2009 | Yu | H04L 63/12 |
| | | | | 713/168 |
| 2009/0288160 | A1* | 11/2009 | Esliger | G06F 21/572 |
| | | | | 726/17 |
| 2010/0088760 | A1* | 4/2010 | Greb | G01R 31/31719 |
| | | | | 726/21 |
| 2010/0186080 | A1* | 7/2010 | Thanner | G06F 21/606 |
| | | | | 726/16 |
| 2010/0199077 | A1* | 8/2010 | Case | G06F 11/3656 |
| | | | | 713/1 |
| 2010/0263043 | A1* | 10/2010 | Xu | G06F 11/26 |
| | | | | 726/17 |
| 2010/0303239 | A1* | 12/2010 | James | G06F 11/3656 |
| | | | | 711/E12.008 |
| 2011/0066835 | A1* | 3/2011 | Kothari | G06F 11/3648 |
| | | | | 713/2 |
| 2012/0023356 | A1* | 1/2012 | Byom | G11C 29/021 |
| | | | | 713/340 |
| 2012/0054582 | A1* | 3/2012 | Byom | G11C 16/26 |
| | | | | 714/E11.034 |
| 2012/0167056 | A1* | 6/2012 | Brunswig | G06F 11/362 |
| | | | | 717/129 |
| 2013/0019305 | A1* | 1/2013 | Berenbaum | G06F 21/44 |
| | | | | 726/19 |
| 2014/0126572 | A1* | 5/2014 | Hutton | H04L 47/805 |
| | | | | 370/360 |

| | | | | |
|---|---|---|---|---|
| 2014/0344960 | A1* | 11/2014 | Adams | G06F 21/86 |
| | | | | 726/34 |
| 2015/0026519 | A1* | 1/2015 | Wu | G06F 11/263 |
| | | | | 714/30 |
| 2016/0077916 | A1* | 3/2016 | Shabel | G06F 1/3215 |
| | | | | 714/22 |
| 2016/0098332 | A1* | 4/2016 | Liu | G06F 11/2242 |
| | | | | 710/316 |
| 2016/0179646 | A1* | 6/2016 | Neve De Mevergnies | |
| | | | | G06F 11/27 |
| | | | | 714/30 |
| 2016/0187420 | A1* | 6/2016 | Trethewey | G01R 31/31705 |
| | | | | 714/727 |
| 2016/0283423 | A1* | 9/2016 | Srivastava | G06F 13/4068 |
| 2016/0344704 | A1* | 11/2016 | Stumpf | H04L 63/10 |
| 2016/0371487 | A1* | 12/2016 | Poornachandran | G06F 21/575 |
| 2017/0180131 | A1* | 6/2017 | Ghosh | G06F 21/75 |
| 2017/0262205 | A1* | 9/2017 | Sugimori | G06F 11/327 |
| 2018/0011775 | A1* | 1/2018 | Baines | G06F 11/3636 |
| 2018/0031632 | A1* | 2/2018 | Blankenburg | G06F 11/3656 |
| 2018/0164371 | A1* | 6/2018 | Morris | G01R 31/31721 |
| 2018/0189195 | A1* | 7/2018 | Chun | G06F 12/1425 |
| 2018/0189493 | A1* | 7/2018 | Schilder | G01R 31/31719 |
| 2018/0198687 | A1* | 7/2018 | Rao | H04L 41/16 |
| 2018/0349253 | A1* | 12/2018 | Woodward | G06F 11/3698 |
| 2018/0349600 | A1* | 12/2018 | Elenes | G06F 21/725 |
| 2019/0013281 | A1* | 1/2019 | Elenes | H03G 3/20 |
| 2019/0042712 | A1* | 2/2019 | Loisel | H04L 9/0631 |
| 2019/0095316 | A1* | 3/2019 | Nagesh | H04L 43/08 |
| 2019/0114428 | A1* | 4/2019 | Kim | H04L 9/321 |
| 2019/0138493 | A1* | 5/2019 | Teh | G06F 13/1673 |
| 2019/0180041 | A1* | 6/2019 | Bhunia | G06F 13/28 |
| 2019/0214102 | A1* | 7/2019 | Park | G06F 21/79 |
| 2019/0258493 | A1* | 8/2019 | Colombo | H04L 9/3247 |
| 2019/0259113 | A1* | 8/2019 | Rao | G06F 16/13 |
| 2019/0361073 | A1* | 11/2019 | Trantham | G06F 11/3656 |
| 2020/0132761 | A1* | 4/2020 | Rahardjo | G01R 31/3177 |
| 2020/0143064 | A1* | 5/2020 | Mayer | G06F 21/62 |
| 2020/0153629 | A1* | 5/2020 | Yitbarek | H04L 9/0897 |
| 2020/0159965 | A1* | 5/2020 | Norem | H04L 9/3268 |
| 2020/0192859 | A1* | 6/2020 | Jones | G06F 15/7864 |
| 2020/0195432 | A1* | 6/2020 | Doll | G06F 21/79 |
| 2020/0278274 | A1* | 9/2020 | Shetty | G06F 11/3051 |
| 2020/0341058 | A1* | 10/2020 | Kirschner | G06F 1/24 |
| 2020/0344112 | A1* | 10/2020 | Reeve | H04L 63/029 |
| 2020/0380121 | A1* | 12/2020 | Pasricha | G06F 21/554 |
| 2021/0049258 | A1* | 2/2021 | Kirschner | G06F 21/572 |
| 2021/0089430 | A1* | 3/2021 | Ko | G06F 11/3652 |
| 2021/0090677 | A1* | 3/2021 | Craske | G06F 9/3005 |
| 2021/0124711 | A1* | 4/2021 | Ansari | G06F 21/575 |
| 2021/0149837 | A1* | 5/2021 | Mishra | G06F 15/7807 |
| 2021/0157747 | A1* | 5/2021 | Shin | G06F 21/602 |
| 2021/0200876 | A1* | 7/2021 | Lin | G06F 9/4401 |
| 2021/0209001 | A1* | 7/2021 | Chiu | G06F 11/3698 |
| 2021/0216616 | A1* | 7/2021 | Lee | G06F 21/805 |
| 2021/0256164 | A1* | 8/2021 | Loisel | H04L 9/0819 |
| 2021/0357125 | A1* | 11/2021 | Mendes | G06F 13/4004 |
| 2021/0357311 | A1* | 11/2021 | Mendes | G06F 11/3648 |
| 2021/0365557 | A1* | 11/2021 | Chokshi | G06F 11/3648 |
| 2021/0406405 | A1* | 12/2021 | Tanami | H04L 9/0825 |
| 2022/0011968 | A1* | 1/2022 | Singh | G06N 3/08 |
| 2022/0027519 | A1* | 1/2022 | Kataria | H04L 63/10 |
| 2022/0027520 | A1* | 1/2022 | Li | G06F 12/1425 |
| 2022/0095917 | A1* | 3/2022 | Jeong | G16H 40/63 |
| 2022/0114261 | A1* | 4/2022 | Ben-Avi | G06F 21/44 |
| 2022/0121557 | A1* | 4/2022 | Golla | G06F 11/2236 |
| 2022/0138077 | A1* | 5/2022 | Ozel | G06F 3/016 |
| | | | | 714/45 |
| 2022/0166855 | A1* | 5/2022 | Wang | H04L 69/10 |
| 2022/0350875 | A1* | 11/2022 | Golombek | G06F 21/44 |
| 2022/0365843 | A1* | 11/2022 | Li | G06F 11/1004 |
| 2022/0376920 | A1* | 11/2022 | Aune | H04L 9/0877 |
| 2022/0385467 | A1* | 12/2022 | Ramadasse | H04L 9/3268 |
| 2023/0041147 | A1* | 2/2023 | Lu | G06F 21/606 |
| 2023/0078058 | A1* | 3/2023 | Mitchell | G06F 21/575 |
| | | | | 726/22 |
| 2023/0083979 | A1* | 3/2023 | Mitchell | G06Q 10/0837 |
| | | | | 726/26 |

(56) References Cited

U.S. PATENT DOCUMENTS

| | | | |
|---|---|---|---|
| 2023/0102099 A1* | 3/2023 | Raju | G06F 11/0772 |
| | | | 714/15 |
| 2023/0153252 A1* | 5/2023 | Park | G06F 12/1466 |
| | | | 711/164 |
| 2023/0188326 A1* | 6/2023 | Lee | H04L 9/0825 |
| 2023/0297491 A1* | 9/2023 | Sariel | G06F 11/366 |
| | | | 717/124 |
| 2023/0315648 A1* | 10/2023 | Durham | G06F 12/145 |
| 2023/0342476 A1* | 10/2023 | Ziecik | G06F 21/575 |
| 2023/0359729 A1* | 11/2023 | Duggan | G06F 21/563 |
| 2023/0359739 A1* | 11/2023 | Duggan | G06F 21/57 |
| 2023/0393772 A1* | 12/2023 | Benisty | G06F 3/067 |
| 2024/0020361 A1* | 1/2024 | Dorris | G06F 21/121 |
| 2024/0020362 A1* | 1/2024 | Dorris | G06F 9/45558 |
| 2024/0070049 A1* | 2/2024 | Liu | G06F 21/53 |
| 2024/0187231 A1* | 6/2024 | Krummel | G06F 21/566 |
| 2024/0267211 A1* | 8/2024 | Shingala | G06F 21/64 |
| 2025/0173175 A1* | 5/2025 | Wang | G06F 9/45558 |

* cited by examiner

| FIELD | DATA VALUE | | | |
|---|---|---|---|---|
| DEVELOPMENT | 0/0/0 | 0/1/0 | 0/1/1 | 0/0/1 |
| MANUFACTURED | 1/0/0 | 1/1/0 | 1/1/1 | 1/1/0 |
| OEM ALLOWED | 1/0/1 | 1/1/1 | 0/0/1 | 0/1/1 |

1

CONTROL OF DEBUG PORT ACCESS TO DATA IN A MEMORY DEVICE, OPERATING METHOD OF THE SAME, AND MEMORY SYSTEM

CROSS-REFERENCE TO RELATED APPLICATION

This application is based on and claims priority under 35 U.S.C. § 119 to Korean Patent Application No. 10-2022-0174952, filed on Dec. 14, 2022 in the Korean Intellectual Property Office, the disclosure of which is incorporated by reference herein in its entirety.

BACKGROUND

The inventive concept relates to a memory device, an operating method of the memory device, and a memory system, and more particularly, to a memory device encrypting user data and prohibiting in principle an access of a third party to the user data, an operating method of the memory device, and a memory system.

When an error occurs in a memory device after the memory device is delivered to a customer's company (hereinafter, referred to as customer company), the memory device may be re-delivered to a manufacturer. When the memory device is re-delivered to the manufacturer, and the manufacturer may unlimitedly access information of the customer company, there is an issue that important information of the customer company may be leaked.

When the user data about the customer company is stored in the memory device, to prevent leakage of the user data to the manufacturer, technology is needed to encrypt the user data and block providing the user data to an arbitrary third party.

SUMMARY

One or more example embodiments provide a method of preventing leakage of user data to a manufacturer, in the case when the user data of a customer company is stored in a memory device.

Further, one or more example embodiments provide a memory device which prevents the user data from being provided to an arbitrary third party, by blocking access to the data encryption key via data bus.

According to an aspect of an example embodiment, a memory device includes: one or more non-volatile memories configured to store user data and at least one key related to the user data; a network-on-chip comprising a bus manager configured to manage access to the user data and the at least one key; and a debug port directly connected to a host and configured to receive a request from the host, wherein the bus manager is further configured to, based on the debug port being activated, determine whether to allow access of the host to the user data and the at least one key based on classification information.

According to an aspect of an example embodiment, an operating method of a memory device, includes: storing user data and at least one key related to the user data; managing access to the user data and the at least one key; and receiving a request from a host, wherein the managing the access to the user data and the at least one key comprises, based on a debug port being activated, determining whether to allow access of the host to the user data and the at least one key based on classification information.

According to an aspect of an example embodiment, a memory system includes: a memory device configured to store user data; and a host configured to diagnose an error of the memory device; wherein the memory device includes: one or more non-volatile memories configured to store user data and at least one key related to the user data, a network-on-chip comprising a bus manager configured to manage access to the user data and the at least one key, and a debug port directly connected to the host and configured to receive a request from the host, and wherein the bus manager is further configured to, based on the debug port being activated, determine whether to allow access of the host to the user data and the at least one key based on classification information.

BRIEF DESCRIPTION OF THE DRAWINGS

The above and/or other aspects will be more clearly understood from the following detailed description of example embodiments taken in conjunction with the accompanying drawings in which:

FIG. 10 is a table of classification information according to an embodiment;

DETAILED DESCRIPTION

Figure 1:
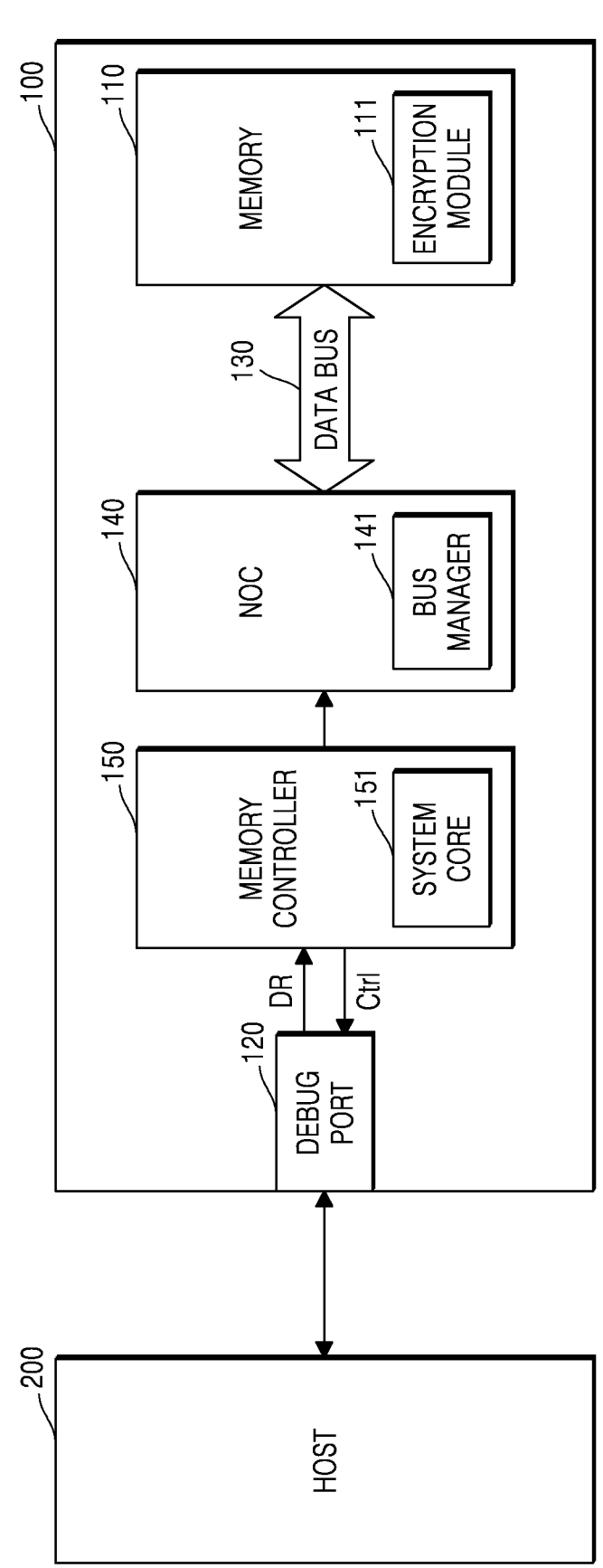
FIG. 1 is a block diagram of a memory system according to an embodiment.

FIG. 1 is a block diagram of a memory system 10 according to an embodiment.

Referring to FIG. 1, the memory system 10 may include a memory device 100 and a host 200.

The memory device 100 according to an embodiment may store a plurality of pieces of data, and provide at least one piece of data according to a request from the host 200. The memory device 100 according to an embodiment may encrypt and store a plurality of pieces of data. For example, the memory device 100 may encrypt and store user data.

The memory device 100 according to an embodiment may include a memory 110, a debug port 120, a data bus 130, a network-on-chip (NOC) 140, or a memory controller 150.

The memory 110 according to an embodiment may store at least one of user data and a security-related key. For example, the memory 110 may include a plurality of non-volatile memories, and may store at least one of the user data and the security-related keys. The memory 110 according to an embodiment may include an encryption module 111. The encryption module 111 according to an embodiment may generate a data encryption key which encrypts the user data and decrypts the encrypted user data. The memory 110 according to an embodiment may include at least one memory region storing the generated data encryption key. The memory 110 according to an embodiment may include a non-volatile memory or a volatile memory.

The host 200 in FIG. 1 may include a manufacturer, and thus, embodiments, in which access by the manufacturer to at least one of the user data and keys stored in the memory 110 is managed, are mainly to be described.

As an example, the memory 110 may include a non-volatile memory device, such as a NAND flash memory, a vertical NAND flash memory, and a NOR flash memory. The memory 110 according to an embodiment may be implemented as, for example, a volatile memory, such as dynamic RAM (DRAM), a mobile DRAM, static RAM (SRAM), phase change RAM (PRAM), ferro-electric RAM (FRAM), resistive RAM (RRAM), and/or magnetic RAM (MRAM).

In some embodiments, the memory device 100 or the memory system 10 may be implemented as an embedded memory inside an electronic device, or may be implemented as an external memory detachable from the electronic device. As an example, the memory device 100 or the memory system 10 may be implemented in various forms, such as an embedded universal flash storage (UFS) memory device, an embedded multi-media card (eMMC), a solid state drive (SSD), a UFS memory card, a compact flash (CF) memory card, a secure digital (SD) memory card, a micro-SD memory card, a mini-SD memory card, an extreme digital (xD) memory, and a memory stick.

The debug port 120 according to an embodiment may be directly connected to the host 200, and receive a request from the host 200. For example, the memory controller 150 may receive the user data request from the host 200 via the debug port 120, and access data stored in the memory 110 based on the received user data request. For example, when an access request for the user data is received from the host 200, the memory controller 150 may attempt to access a memory region, in which the user data is stored, via the debug port 120. The memory controller 150 according to an embodiment may receive a request signal for a plurality of pieces of data, and access the plurality of pieces of data via the data bus 130 based on the received request signal.

The data bus 130 according to an embodiment may connect the debug port 120 to the memory 110, and transmit data stored in the memory 110 to the debug port 120. For example, when the host 200 requests data stored in at least one region of the memory 110 via the debug port 120, the memory 110 may allow or prohibit access of the memory controller 150 via the data bus 130.

The NOC 140 according to an embodiment may manage access to at least one of the user data and the security-related keys based on the classification information. In some embodiments, the classification information may include information referred to determine whether to allow or prohibit access of the host 200 via the debug port 120 to the at least one of the user data and the security-related keys stored in the memory 110. In some embodiments, the security-related keys may include a first key used to encrypt or decrypt the user data and a second key for protecting the first key. For example, the first key may correspond to a data encryption key, and the second key may correspond to a root key. The NOC 140 according to an embodiment may include a bus manager 141, and may manage access of the debug port 120 to the data bus 130 via the bus manager 141.

The bus manager 141 according to an embodiment may determine whether to allow access of the host 200 to the at least one of the user data and the security-related keys, based on the classification information when the debug port 120 is activated. The classification information according to an embodiment may include the first field and the second field. The first field according to an embodiment may have a value set to indicate whether the memory device 100 is in a pre-manufacturing stage or a post-manufacturing stage.

The second field according to an embodiment may be set to indicate whether the memory device 100 allows access of the manufacturer to at least one of the user data and the security-related keys after the manufacturing stage.

The bus manager 141 according to an embodiment may detect whether the debug port 120 is activated, and when detecting that the debug port 120 is activated, may determine whether to allow access of the host 200 to at least one of the user data and the security-related keys based on a value set in the first field.

For example, when the first field is set to a first value indicating that the memory device 100 is in the manufacturing stage, the bus manager 141 may allow access of the host 200 to at least one of the user data and the security-related keys. In other words, when the memory device 100 is in the manufacturing stage, it may be necessary to allow access of the host 200, which is the manufacturer, to various memory settings, debugging, or the like, of the memory device 100. In addition, when the first field is set to a second value indicating that the memory device 100 is in the post-manufacturing stage, the bus manager 141 may determine whether to allow access of the host 200 to the at least one of the user data and the security-related keys, further based on the second field.

The bus manager 141 according to an embodiment may determine whether to allow access of the host 200 to at least one of the user data and the security-related keys based on a data value of the second field. For example, when a first value is recorded in the second field, the bus manager 141 may allow access of the host 200 to at least one of the user data and the security-related keys. The first value according to an embodiment may include information about allowing access of the host 200 to at least one of the user data and the security-related keys, which have been determined according to a preset rule. For example, when the first value is recorded in the second field, the first value may include information about access of the manufacturer to the user data and keys related thereto, which the customer company has allowed. The memory device 100 according to an embodiment may allow access of the host 200 to at least one of the user data and the security-related keys, by allowing access of the debug port 120 to the data bus 130, when the data value of the second field is the first value.

However, when the data value of the second field is the second value, the bus manager 141 according to an embodiment may prohibit the manufacturer from accessing the user data and the keys related thereto. For example, when the data value of the second field is the second value, the bus manager 141 may prohibit access of the debug port 120 to the data bus 130. The second value according to an embodiment may include information about prohibiting access of the manufacturer to the user data and keys related thereto.

When a value of the first field indicates "the pre-manufacturing stage" of the memory device 110, the bus manager 141 according to an embodiment may allow access of the host 200 to at least one of the user data and the security-related keys. In other words, when the memory device 100 is "not in the manufacturing stage", the bus manager 141 may allow access of the manufacturer to at least one of the user data and the security-related keys.

When a value of the second field indicates "the post-manufacturing stage", the bus manager 141 according to an embodiment may allow access of the host 200 to at least one of the user data and the keys related thereto, based on the value of the second field. In an embodiment, the value of the second field may be set by the customer company. In other words, when the memory device 100 is delivered to the customer company after the manufacturing stage, the bus manager 141 according to an embodiment may, in principle, prohibit access of the manufacturer to the user data and the keys related thereto. However, when the customer company sets up to allow access of the manufacturer, the bus manager 141 according to an embodiment may, in principle, allow access of the manufacturer to the user data and the keys related thereto.

The at least one of the user data and the security-related keys may include a data encryption key DEK, and the data encryption key DEK may be referred to as a decryption key, when used in a decryption operation. Alternatively, the at least one thereof may include a root key for the data encryption key DEK. For example, the manufacturer may access the data encryption key DEK, and interpret the encrypted user data by using the data encryption key DEK. In addition, the manufacturer according to an embodiment may access the root key for the data encryption key DEK, and interpret the encrypted user data by using the root key for the data encryption key DEK. For example, the manufacturer may generate the data encryption key DEK based on the root key for the data encryption key DEK, and interpret the encrypted user data by using the generated data encryption key DEK.

When the memory device 100 according to an embodiment does not support a self-encryption operation on the user data, the user data may be stored in a plain text form. For example, when the memory device 100 does not support the self-encryption operation on the user data, the user data may be stored in the memory device 100 in the original state. When the memory device 100 does not support the self-encryption operation on the user data, the bus manager 141 according to an embodiment may block the connection of the data bus 130 to the memory component 110, in which the user data is stored, unless the customer company allows provision of the user data.

The memory controller 150 according to an embodiment may include a system core 151, and may receive signals transmitted by the host 200 via the debug port 120. For example, the memory controller 150 may receive a data request signal DR for the memory 110.

The memory controller 150 according to an embodiment may generate a signal for controlling various components in the memory device 100. For example, the memory controller 150 may receive a plurality of requests from the host 200, and generate a control signal Ctrl for the debug port 120 or the NOC 140. For example, the memory controller 150 may receive the data request signal DR, and generate a signal for activating the debug port 120 and a control operation start signal for the bus manager 141. However, the signal generated by the memory controller 150 is not limited thereto.

Figure 2A:
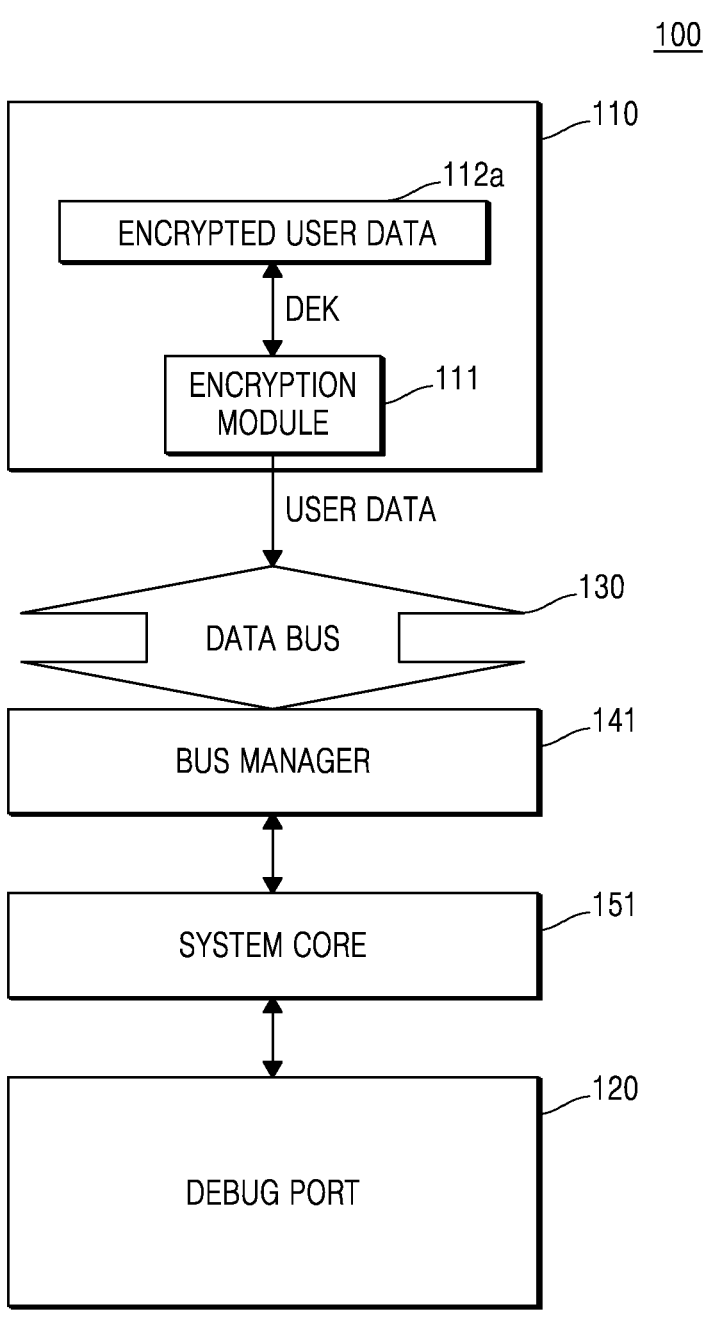
FIGS. 2A, 2B, and 3 are block diagrams of a memory device according to embodiments.
Figure 2B:
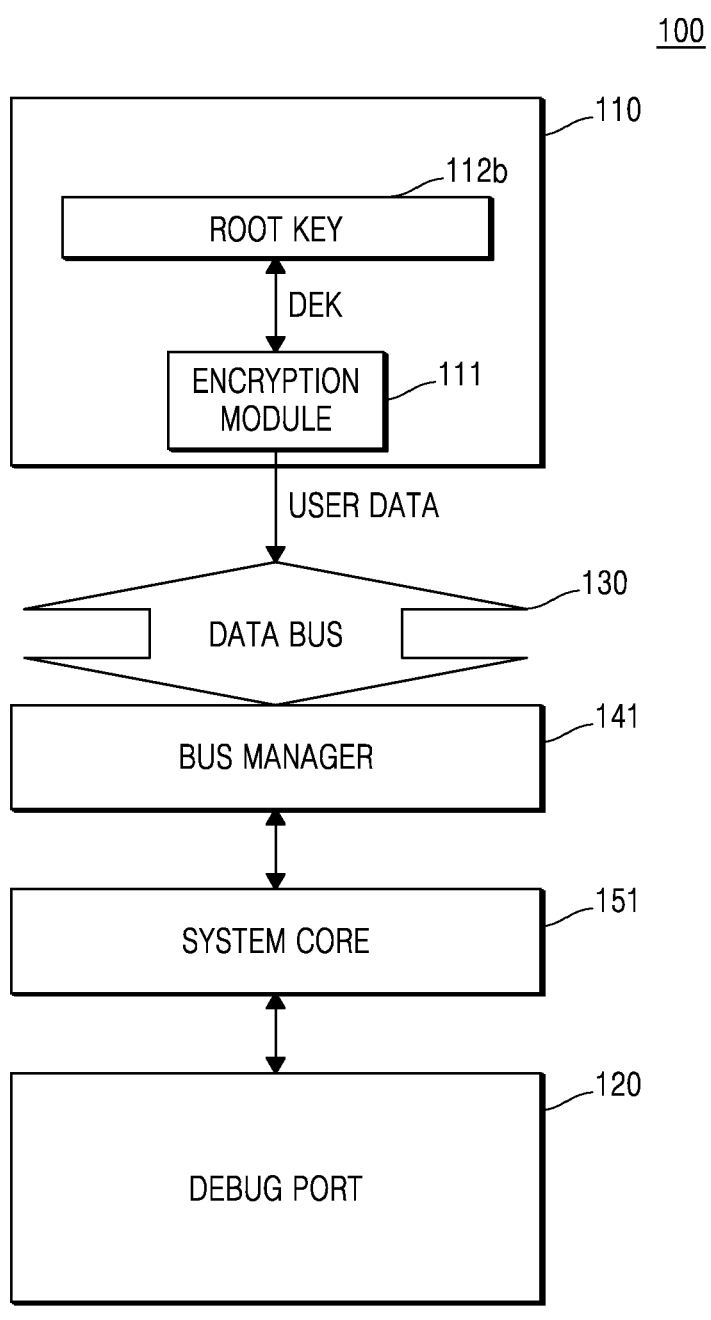
Figure 3:
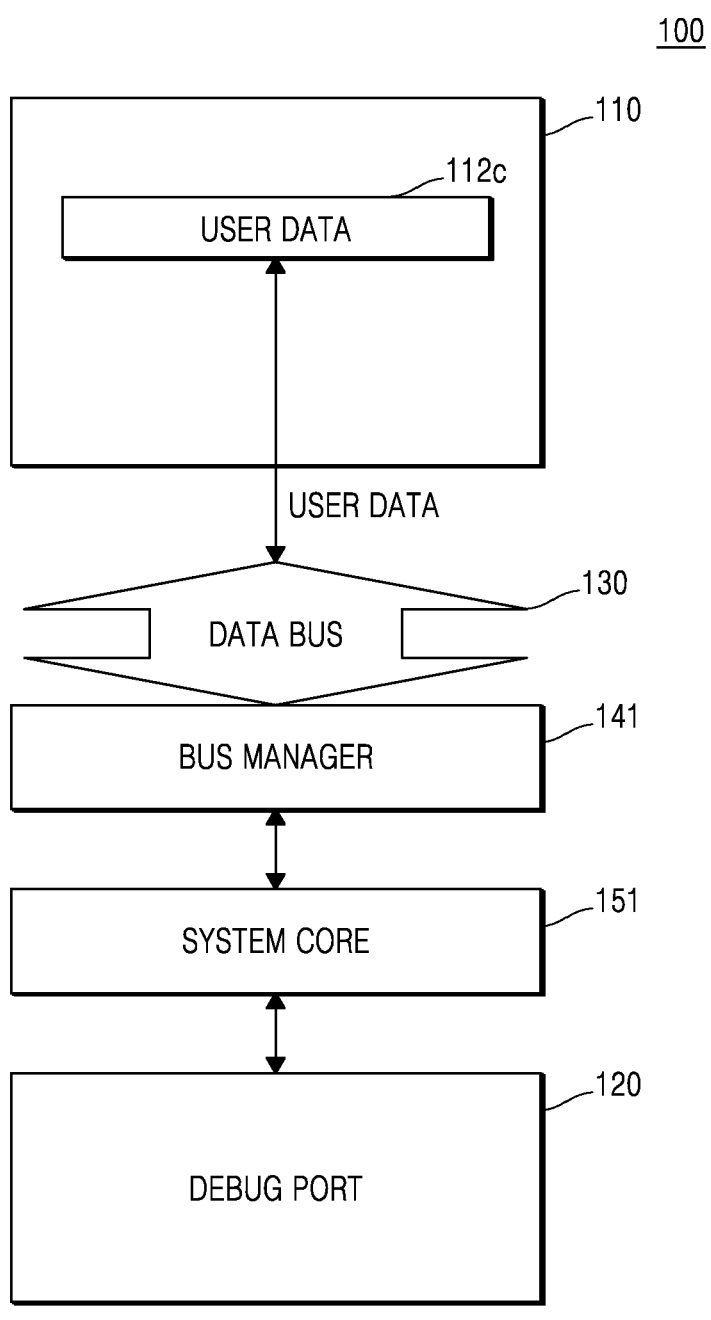

FIGS. 2A, 2B, and 3 are block diagrams of the memory device 100 according to embodiments.

FIG. 2A illustrates a case, in which encrypted user data is stored in the memory device 100, according to an embodiment.

Referring to FIG. 2A, the memory device 100 according to an embodiment may include the encryption module 111, and may store the encrypted user data in a first region 112a included in the memory 110. The first region 112a according to an embodiment may include an arbitrary region in which the encrypted user data is stored. The memory 110 according to an embodiment may provide the data encryption key DEK for the encrypted user data via the encryption module 111. Under conditions where user data may be provided, the memory device 100 according to an embodiment may decrypt the encrypted user data by using the data encryption key DEK and provide user data to the data bus 130.

When the memory device 100 according to an embodiment receives a user data request signal from the host 200, the debug port 120 may access the data bus 130 via at least one system core 151 included in the memory controller 150. When the memory controller 150 according to an embodiment accesses the data bus 130 via the debug port 120 and requests the encrypted user data stored in the first region 112a of the memory 110, the bus manager 141 may control the data bus 130 to prohibit provision of the encrypted user data according to the state of the memory device 100.

The memory device 100 according to an embodiment may determine whether to provide user data based on the classification information. The classification information according to an embodiment may include the first field and the second field. The first field according to an embodiment may include a field indicating whether the memory device 100 is in or after the manufacturing stage, and the second field may include a field indicating whether to allow access of the manufacturer. The second field according to an embodiment may be set by the customer company.

For example, the first field may include data indicating the pre-manufacturing stage of the memory device 100, and the second field may include data indicating the post-manufacturing stage or an original equipment manufacturing stage (OEM) allowance stage of the memory device 100. The classification information according to an embodiment may include data of a development stage field, a manufacturing stage field, an OEM allowance stage. The first field according to an embodiment may include data in the development stage or the manufacturing stage. The second field according to an embodiment may include data of the OEM allowance stage field of the customer company.

For example, when the classification information of the memory device 100 is for the post-manufacturing stage, the bus manager 141 may prohibit provision of the encrypted user data by disconnecting the data bus 130 from the debug port 120. According to an embodiment, the bus manager 141 may prohibit provision of the encrypted user data, by prohibiting the debug port 120 from accessing the data encryption key DEK of the encrypted user data.

FIG. 2B illustrates a case in which a root key is stored in the memory device 100, according to an embodiment.

Referring to FIG. 2B, the memory device 100 according to an embodiment may include the encryption module 111, and may store the root key for user data in a second region 112b in the memory 110. The second region 112b according to an embodiment may include an arbitrary region, in which the root key for the user data is stored. The memory 110 according to an embodiment may provide the data encryption key DEK for the encrypted user data via the encryption module 111. When the user data may be provided, the memory device 100 according to an embodiment may decrypt the encrypted user data based on the root key for the data encryption key DEK. The root key according to an embodiment, as a unique key of the memory device 100, may include a key, in which the data encryption key DEK has been encrypted once again.

When the encrypted user data according to an embodiment is generated, the encryption module 111 may generate the data encryption key DEK based on the root key 112*b*, and may provide the user data to the data bus 130 by decrypting the encrypted user data by using the data encryption key DEK.

When the memory device 100 according to an embodiment receives a user data request signal from the host 200, the debug port 120 may access the data bus 130 via at least one system core 151 included in the memory controller 150. When the host 200 according to an embodiment accesses the data bus 130 via the debug port 120 and requests the root key 112*b* for the user data stored in the second region of the memory 110, the bus manager 141 may control the data bus 130 so that provision of the root key for the user data is prohibited according to the state of the memory device 100. For example, when the memory device 100 is in the post-manufacturing stage, the bus manager 141 may prohibit provision of the root key for the user data by disconnecting the data bus 130 from the debug port 120. The bus manager 141 according to an embodiment may prohibit provision of the encrypted user data by prohibiting the host 200 from accessing the root key for the user data via the debug port 120.

FIG. 3 is an embodiment of the case, in which un-encrypted user data is stored in the memory device 100, according to an embodiment.

Referring to FIG. 3, when the memory device 100 according to an embodiment does not support the self-encryption operation on the user data, the user data may be stored in a plain text format. For example, the user data may be stored in a third region 112*c* of the memory 110. The third region 112*c* according to an embodiment may include an arbitrary region of the memory 110, in which the user data is stored without being encrypted.

When the user data is stored in the original state, the memory device 100 according to an embodiment may prohibit provision of the user data by releasing the connection of the debug port 120 to the data bus 130. For example, when the debug port 120 receives the user data request signal from the host 200 and accesses the data bus 130 via the system core 151, the bus manager 141 may prohibit provision of the user data by releasing the connection of the debug port 120 to the data bus 130. When the customer company allows provision of the user data or the memory device 100 is in the pre-manufacturing stage, the bus manager 141 according to an embodiment may allow provision of the user data by maintaining the connection of the debug port 120 to the data bus 130.

Figure 4:
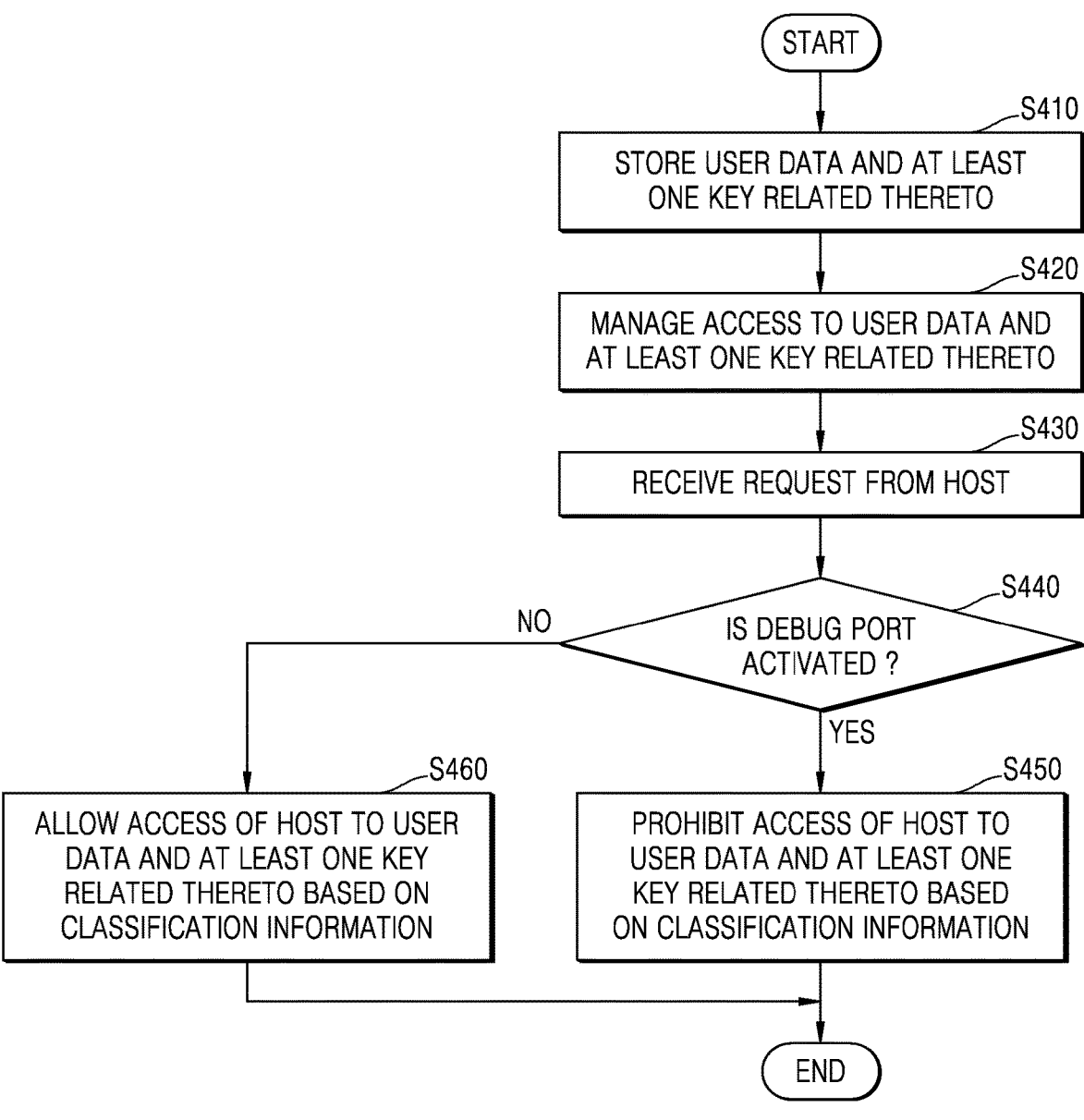
FIG. 4 is a flowchart of an operating method of a memory device, according to an embodiment.

FIG. 4 is a flowchart of an operating method of the memory device 100, according to an embodiment.

Referring to FIG. 4, the memory device 100 according to an embodiment may store the user data and at least one key related thereto (S410).

The user data and the at least one key related thereto according to an embodiment may be stored in an arbitrary region included in the memory 110. In addition, the at least one key according to an embodiment may include the security-related key. For example, the user data may be encrypted and stored in the first region 112*a*, and the security-related key may be stored in the second region 112*b*. In addition, when the user data is not encrypted, the memory device 100 according to an embodiment may store the decrypted user data in the third region 112*c*. The user data and the at least one security-related key related thereto according to an embodiment may include a preset data encryption key DEK or the root key for the data encryption key DEK.

When the user data and the at least one key related thereto are stored, the memory device 100 according to an embodiment may manage access to the user data and the at least one key related thereto (S420). The memory device 100 according to an embodiment may manage access to the user data and the at least one key related thereto by controlling access of the debug port 120 to the data bus 130.

The memory device 100 according to an embodiment may receive a request from the host 200 (S430). For example, the memory device 100 may receive a request signal for the user data from the host 200. When the request signal from the host 200 for the user data is received, the memory device 100 according to an embodiment may determine whether to provide the user data based on the classification information. The classification information according to an embodiment may include the first field and the second field, the first field may include data indicating that the memory device 100 is in the pre-manufacturing stage, and the second field may include data indicating that the memory device 100 is in the post-manufacturing stage or the OEM allowance stage.

When a request from the host 200 is received, the memory device 100 according to an embodiment may determine whether the debug port 120 is activated (S440). The memory device 100 according to an embodiment may determine whether to allow access of the host 200 to the user data and the at least one key related thereto, based on the classification information when the debug port 120 is activated.

When the debug port 120 is determined as being activated, the memory device 100 according to an embodiment may prohibit access of the host 200 to the user data and the at least one key related thereto based on the classification information (S450). When the debug port 120 is activated, the memory device 100 may determine that the manufacturer is accessing the encrypted user data, and may prohibit access of the host 200 to the user data and the at least one key related thereto. The classification information according to an embodiment may include the second value. The second value according to an embodiment may include information about prohibiting access of the manufacturer to the user data and keys related thereto.

However, when the debug port 120 is determined as being not activated, the memory device 100 according to an embodiment may allow access of the host 200 to the user data and the at least one key related thereto based on the classification information (S460). The classification information according to an embodiment may include the first value. The first value according to an embodiment may include information about allowing access of the host 200 to the user data and the at least one key related thereto, which have been determined according to a preset rule. The first value may include information about that the memory device 100 is in the pre-manufacturing stage. In addition, when the first value is recorded in the second field, the first value according to an embodiment may include information about access of the manufacturer to the user data and keys related thereto, which the customer company has allowed.

Figure 5:
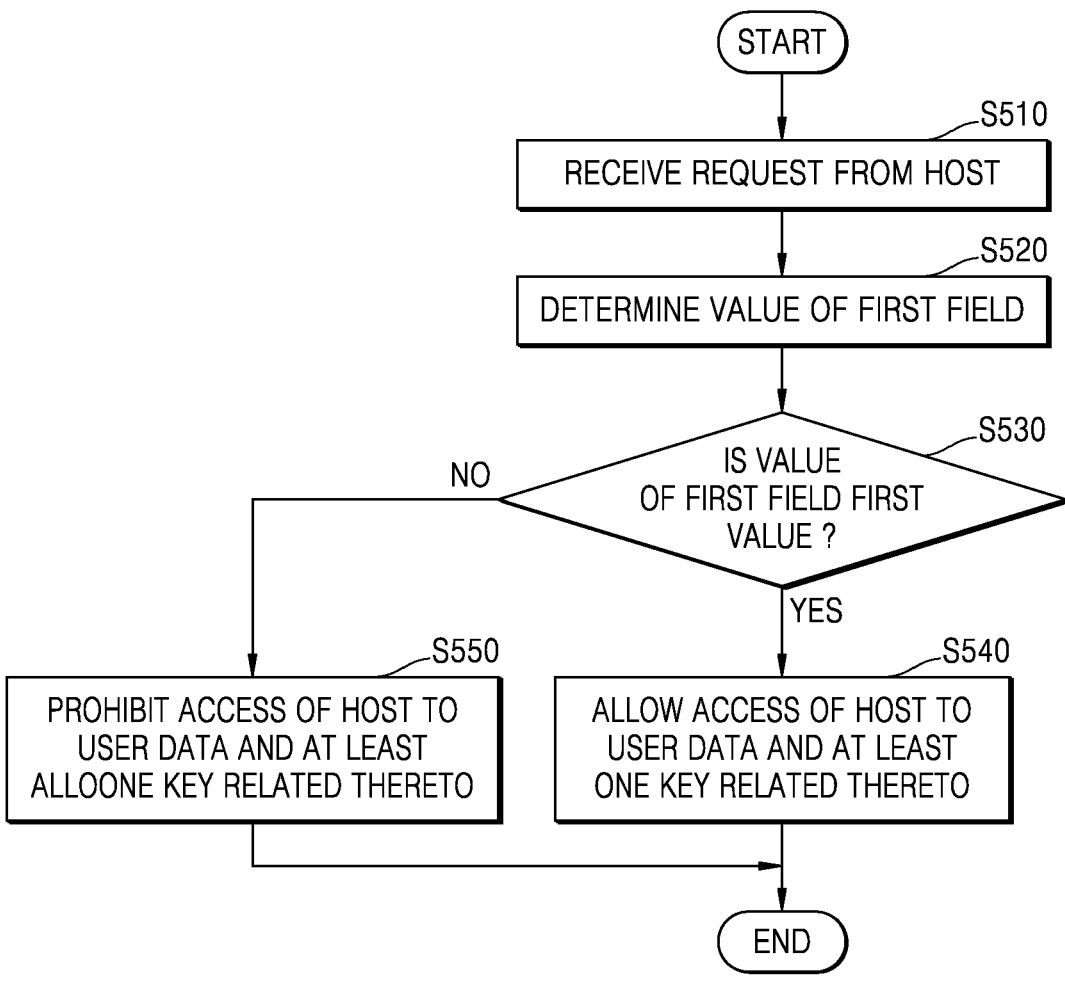
FIG. 5 illustrates a case, in which access to user data is allowed in a pre-manufacturing stage of a memory device, in an operating method of the memory device, according to an embodiment.

FIG. 5 illustrates a case, in which access to user data is allowed in the pre-manufacturing stage of the memory device 100, in an operating method of the memory device 100, according to an embodiment.

Referring to FIG. 5, the memory device 100 according to an embodiment may receive a request from the host 200 (S510). For example, the memory device 100 may receive a request signal for the user data from the host 200.

When a request from the host 200 is received, the memory device 100 according to an embodiment may determine the value of the first field (S520). The first field according to an embodiment may include data values in the manufacturing stage and the pre-manufacturing stage. The memory device 100 according to an embodiment may determine whether to allow access of the host 200 to the user data and the at least one key related thereto based on the data value of the first field. The at least one key related to the user data according to an embodiment may include a security-related key related to the user data.

The memory device 100 according to an embodiment may determine whether the value of the first field is the first value (S530). The first value according to an embodiment may include information about allowing access of the host 200 to the user data and the at least one key related thereto, which have been determined according to a preset rule. The first value may include information about that the memory device 100 is in the pre-manufacturing stage.

When the value of the first field is determined as the first value, the memory device 100 according to an embodiment may allow access of the host 200 to the user data and the at least one key related thereto (S540). When the first value is recorded in the first field, the memory device 100 may allow access of the host 200 to the user data and the at least one key related thereto. In addition, the memory device 100 according to an embodiment may allow access of the host 200 to the user data and the at least one key related thereto, by allowing access of the debug port 120 to the data bus 130, when the data value of the first field is the first value.

When the value of the first field is not determined as the first value, the memory device 100 according to an embodiment may prohibit access of the host 200 to the user data and the at least one key related thereto (S550). For example, when the value of the first field is not the first value, the memory device 100 may determine that the memory device 100 is in the post-manufacturing stage or the OEM allowance stage, and may prohibit access of the debug port 120 to user data.

Figure 6:
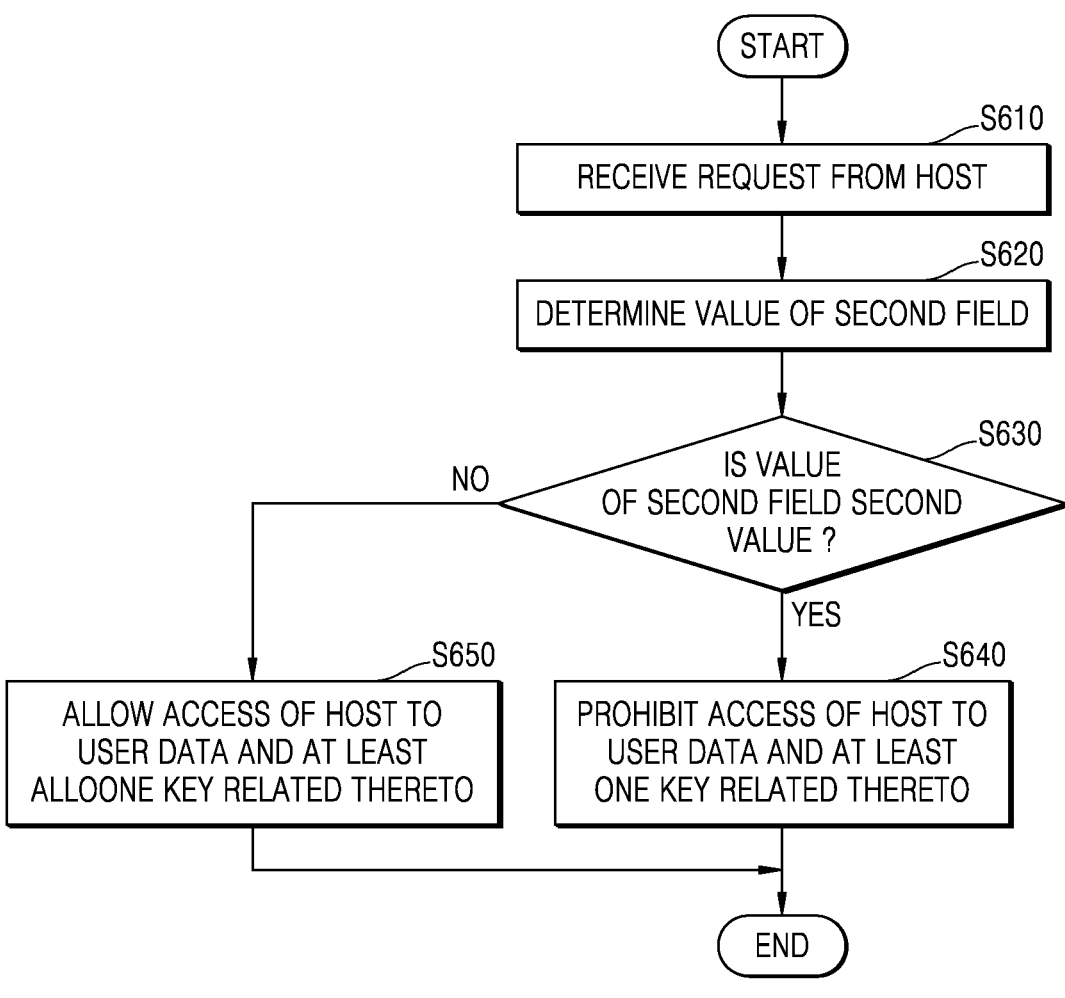
FIG. 6 illustrates a case, in which access to user data is allowed in an operation a post-manufacturing stage of a memory device, in an operating method of the memory device, according to an embodiment.

FIG. 6 illustrates a case, in which access to the user data is allowed in the post-manufacturing stage of the memory device 100, in an operating method of the memory device 100, according to an embodiment.

Referring to FIG. 6, the memory device 100 according to an embodiment may receive a request from the host 200 (S610). For example, the memory device 100 may receive a request signal for the user data from the host 200.

When a request from the host 200 is received, the memory device 100 according to an embodiment may determine the value of the second field (S620). The second field according to an embodiment may include data indicating whether to allow access of the manufacturer to the user data and the at least one key related thereto stored in the memory device 100. The user data and the at least one key related thereto according to an embodiment may include the security-related key related to the user data. The memory device 100 according to an embodiment may determine whether to allow access of the host 200 to the user data and the at least one key related thereto based on the data value of the second field.

The memory device 100 according to an embodiment may determine whether the value of the second field is the second value (S630). The second value according to an embodiment may include information about prohibiting access of the manufacturer to the user data and keys related thereto.

When the value of the second field is determined as the second value, the memory device 100 according to an embodiment may prohibit access of the host 200 to the user data and the at least one key related thereto (S640). For example, when the customer company sets that the user data is not provided to the manufacturer in the OEM allowance stage, the memory device 100 may prohibit provision of user data based on the second value of the second field.

When the value of the second field is not determined as the second value, the memory device 100 according to an embodiment may allow access of the host 200 to the user data and the at least one key related thereto (S650).

For example, when the first value is recorded in the second field, the memory device 100 may allow access of the host 200 to the user data and the at least one key related thereto. The first value according to an embodiment may include information about allowing access of the host 200 to the user data and the at least one key related thereto, which have been determined according to a preset rule. For example, when the first value is recorded in the second field, the first value may include information about access of the manufacturer to the user data and keys related thereto, which the customer company has allowed. The memory device 100 according to an embodiment may allow access of the host 200 to the user data and the at least one key related thereto, by allowing access of the debug port 120 to the data bus 130, when the data value of the second field is the first value.

Figure 7:
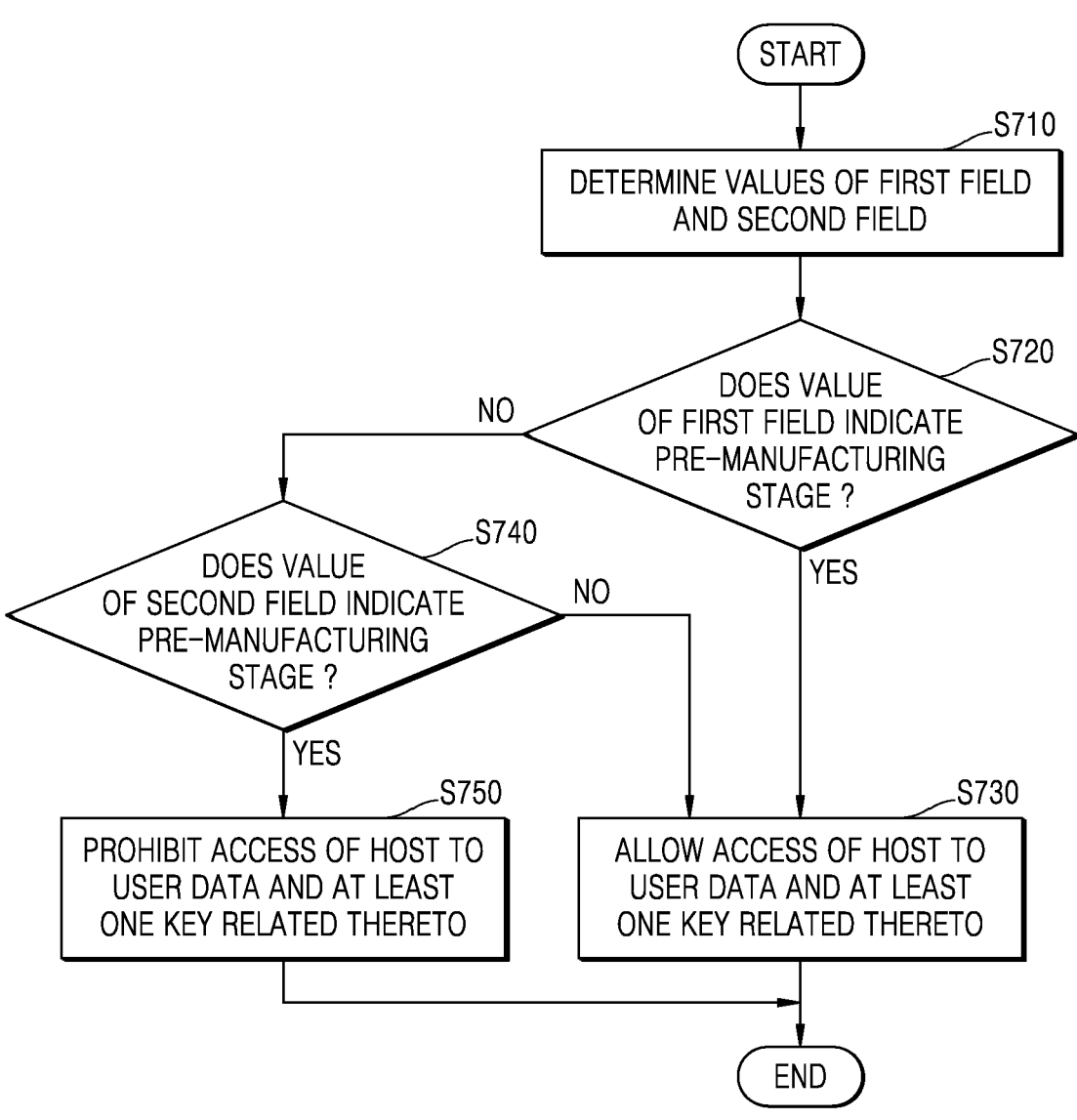
FIG. 7 is a flowchart of whether user data is provided according to a manufacturing stage, in an operating method of a memory device, according to an embodiment.

FIG. 7 is a flowchart of whether user data is provided according to the manufacturing stage, in an operating method of the memory device 100, according to an embodiment.

Referring to FIG. 7, the memory device 100 according to an embodiment may determine values of the first field and the second field (S710). For example, the memory device 100 may determine whether the values of the first field and the second field are the first values. The first value according to an embodiment may include data for allowing access of the manufacturer to the user data and the at least one key related thereto. For example, the first value may include information that the memory device 100 is in the pre-manufacturing stage or that the customer company has allowed an access to the user data. The at least one key related to the user data according to an embodiment may include a security-related key related to the user data.

When the values of the first field and the second field are determined, the memory device 100 according to an embodiment may determine whether the value of the first field indicates pre-manufactured (S720).

When the value of the first field is determined to indicate pre-manufactured, the memory device 100 according to an embodiment may allow access of the host 200 to the user data and the at least one key related thereto (S730). For example, when the value of the first field indicates pre-manufactured, the memory device 100 may determine that the memory device 100 has not yet been delivered to the customer, and allow access of the host 200 to user data.

However, when the value of the first field is not determined to indicate pre-manufactured, the memory device 100 may determine whether the value of the second field indicates post-manufactured (S740). For example, the memory device 100 may determine whether the value of the second field is the second value. The second value according to an embodiment may include information about prohibiting access of the manufacturer to the user data and keys related thereto.

When the value of the second field is determined to indicate post-manufactured, the memory device 100 according to an embodiment may prohibit access of the host 200 to the user data and the at least one key related thereto (S750). For example, when the memory device 100 has been manufactured and delivered to the customer company and the customer has not entered data on provision of the user data, the memory device 100 may prohibit the host 200 from accessing the user data.

However, when the value of the second field does not indicate post-manufactured, the memory device 100 according to an embodiment may allow access of the host 200 to the user data and the at least one key related thereto (S730). For example, when the customer company has entered data in the memory device 100 for allowing access of the manufacturer, the memory device 100 may determine that the value of the second field indicates pre-manufactured, and allow access of the host 200 to the user data and the at least one key related thereto.

Figure 8:
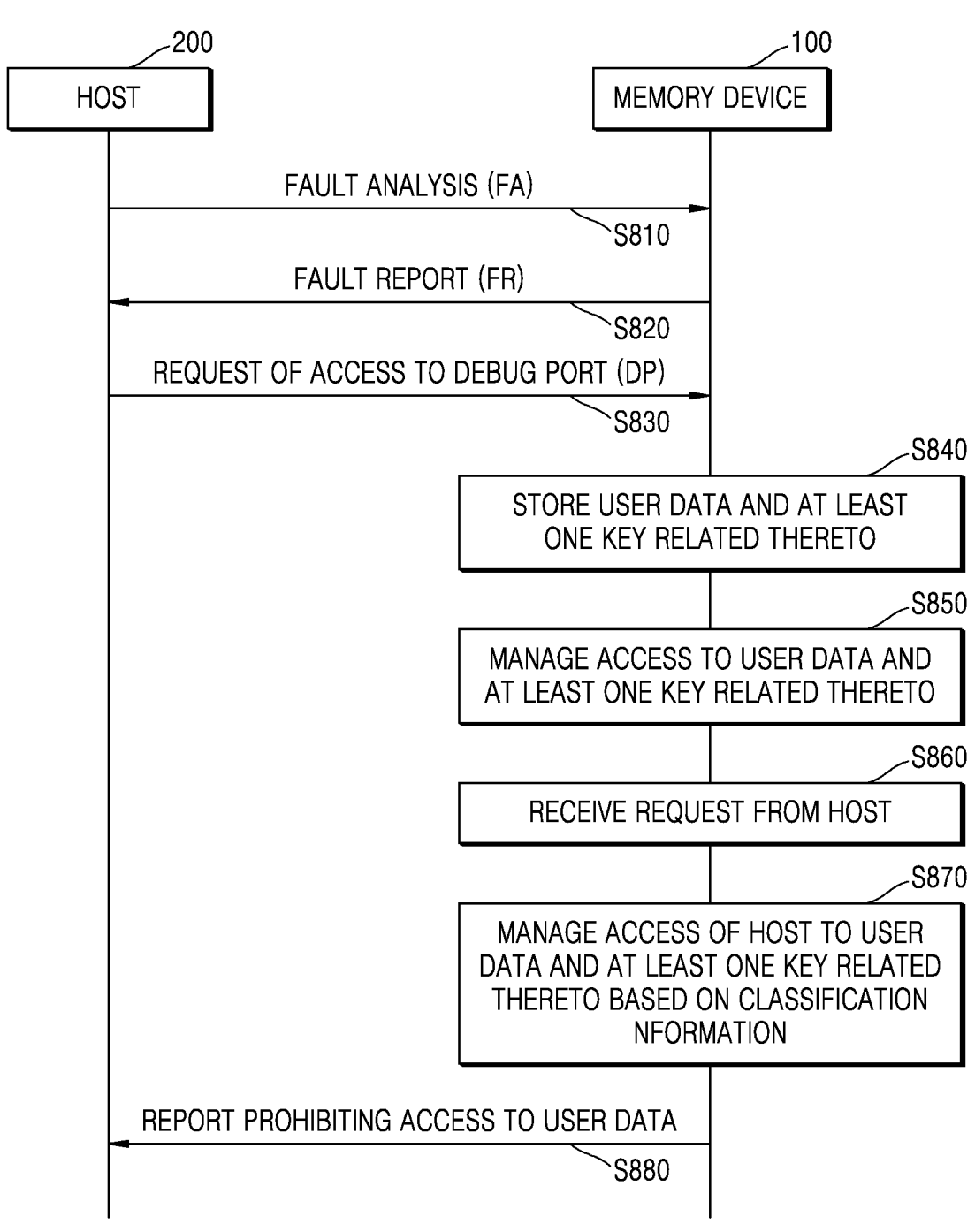
FIG. 8 is a flowchart of an operating method of a memory system, according to an embodiment.

FIG. 8 is a flowchart of an operating method of the memory system 10, according to an embodiment.

Referring to FIG. 8, the memory device 100 according to an embodiment may be delivered back to the manufacturer, when an error occurs after being delivered to the customer company.

When the memory device 100 is delivered back to the manufacturer, the host 200 according to an embodiment may transmit a fault analysis FA signal with respect to the memory device 100 (S810).

When it is determined that an error has occurred, the memory device 100 according to an embodiment may transmit a fault report FR signal to the host 200 (S820).

When the fault report FR signal is received, the host 200 according to an embodiment may transmit a debug port access request signal DA to the memory device 100 (S830).

The memory device 100 according to an embodiment may store the user data and the at least one key related thereto (S840). The at least one key related to the user data according to an embodiment may include a security-related key related to the user data. The user data and the at least one key related thereto according to an embodiment may be stored in an arbitrary region included in the memory 110. For example, the user data may be encrypted and stored in the first region 112a, and the user data and the at least one key related thereto may be stored in the second region 112b. In addition, when the user data is not encrypted, the memory device 100 according to an embodiment may store the decrypted user data in the third region 112c. The user data and the at least one key related thereto according to an embodiment may include a preset data encryption key DEK or the root key for the data encryption key DEK.

When the user data and the at least one key related thereto are stored, the memory device 100 according to an embodiment may manage access to the user data and the at least one key related thereto (S850). The memory device 100 according to an embodiment may manage access to the user data and the at least one key related thereto by controlling access of the debug port 120 to the data bus 130.

The memory device 100 according to an embodiment may receive a request from the host 200 (S860). For example, the memory device 100 may receive a request signal for the user data from the host 200. When the request signal from the host 200 for the user data is received, the memory device 100 according to an embodiment may determine whether to provide the user data based on the classification information. The classification information according to an embodiment may include the first field and the second field, the first field may include data indicating that the memory device 100 is in the pre-manufacturing stage, and the second field may include data indicating that the memory device 100 is in the post-manufacturing stage or the OEM allowance stage.

When a request from the host 200 is received, the memory device 100 according to an embodiment may manage access of the host 200 to the user data and the at least one key related thereto based on the classification information (S870). The memory device 100 according to an embodiment may determine whether to allow access of the host 200 to the user data and the at least one key related thereto, based on the classification information when the debug port 120 is activated. When the debug port 120 is determined as being activated, the memory device 100 according to an embodiment may prohibit access of the host 200 to the user data and the at least one key related thereto based on the classification information. However, when the debug port 120 is determined as being not activated, the memory device 100 according to an embodiment may allow access of the host 200 to the user data and the at least one key related thereto based on the classification information.

Figure 9A:
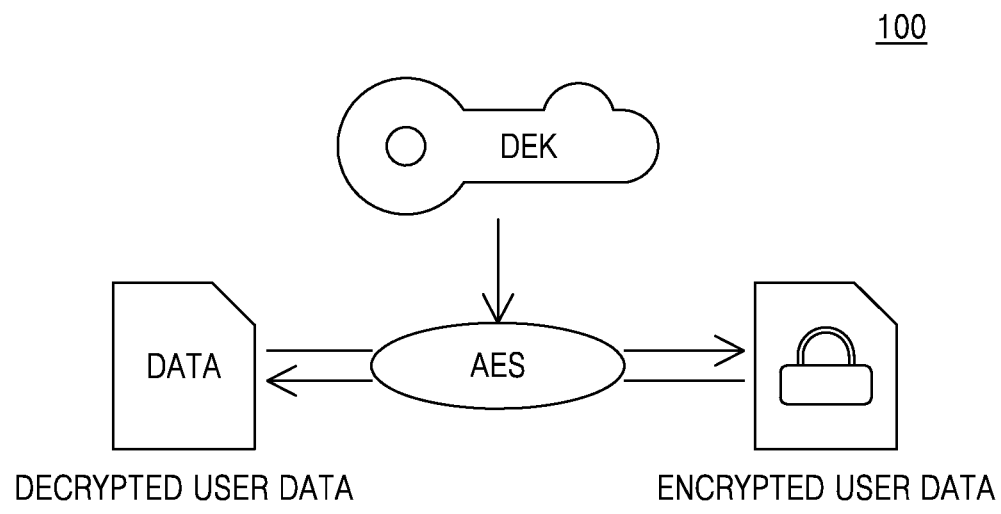
FIGS. 9A and 9B are diagrams illustrating an operation of a data encryption key in a memory device, according to embodiments.
Figure 9B:
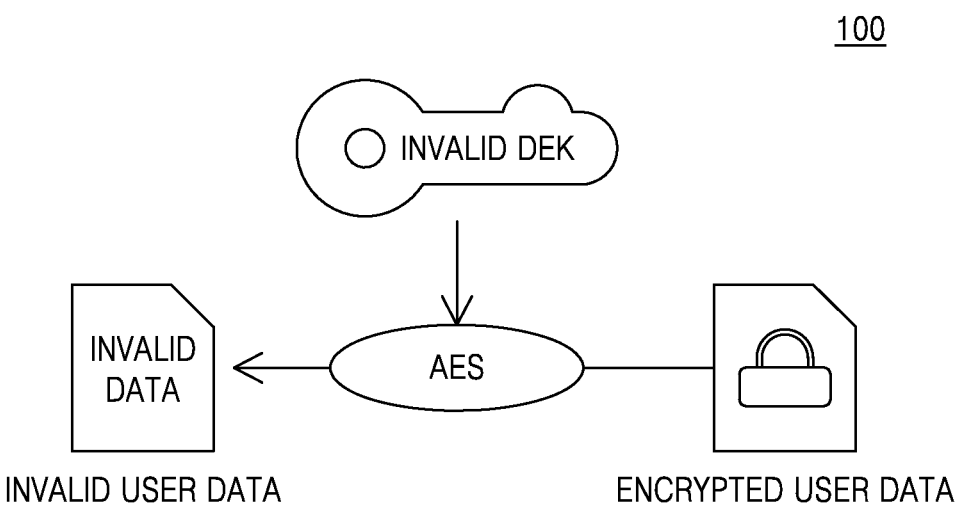

FIGS. 9A and 9B are diagrams illustrating an operation of the data encryption key DEK in the memory device 100, according to embodiments.

FIG. 9A illustrates a process, in which the user data is encrypted and decrypted in the memory device 100, according to an embodiment.

Referring to FIG. 9A, the user data according to an embodiment may be encrypted and decrypted by using an Advanced Encryption Standard (AES) algorithm. For example, the encrypted user data may be interpreted as the user data encrypted by the data encryption key DEK using the AES algorithm. When access of the data encryption key DEK to the encrypted user data according to an embodiment is prohibited, the encrypted user data may not be decrypted, and may not be provided to the host 200. The memory device 100 according to an embodiment may not provide the user data to the manufacturer by prohibiting access of the debug port 120, which have received a request from the host 200, to the data encryption key DEK.

FIG. 9B illustrates an embodiment, in which a DEK, which is invalid and has expired, is provided.

Referring to FIG. 9B, when the memory device 100 is in a post-manufactured stage or when the customer company prohibits provision of the user data, the memory device 100 according to an embodiment may prohibit access of the host 200 to the user data by providing the invalid data encryption key DEK. When the invalid data encryption key DEK is provided, the encrypted user data according to an embodiment may not be decrypted, and invalid user data, which has expired, may be provided.

FIG. 10 is a table of classification information according to an embodiment.

Referring to FIG. 10, the classification information of the memory device 100 according to an embodiment may include data of the development stage field, the manufacturing stage field, and the OEM allowance stage field. The first field according to an embodiment may include data of the development stage or the manufacturing stage. The second field according to an embodiment may include data of the OEM allowance stage of the customer company.

Data according to an embodiment may include a first bit, a second bit, and a third bit. In the data according to an embodiment, the first bit at a first position may be a value indicating whether the memory device 100 is in the manufacturing stage.

For example, when the first bit is "1", it may be determined that the memory device 100 according to an embodiment is in the manufacturing stage. However, when the first bit is "0", it may be determined that the memory device 100 according to an embodiment is in the pre-manufacturing stage. The second bit in a second position may include a value indicating whether the debug port 120 is activated.

For example, when the second bit is "1", it may be determined that the debug port 120 is activated. However, when the second bit is "0", it may be determined that the debug port 120 is not activated. The third bit in a third position may include a value indicating whether the customer company allows provision of the user data.

For example, when the third bit is "1", it may be determined that the customer company has allowed provision of the user data to the manufacturer. However, when the third bit is "0", it may be determined that the customer company has not allowed provision of the user data to the manufacturer. However, the number of bits constituting the data is not limited thereto, and may include various combinations of data.

The data of the manufacturing stage according to an embodiment may include "1/0/0, 1/1/0, 1/1/1, 1/0/1". In the manufacturing stage, the first bit may always be set to "1". When the first bit is set to "1", the memory device 100 according to an embodiment may, in principle, prohibit provision of the user data and the key related thereto to the host 200.

The data of the OEM allowance stage according to an embodiment may include "1/0/1, 1/1/1, 0/0/1, 0/1/1". In the OEM allowance stage, the third bit may be set to "1". For example, when the third bit is set to "1", the memory device 100 according to an embodiment may determine that the customer company has allowed access to user data, and may allow provision of the user data and the key related thereto to the host 200. However, when the third bit is set to "1", the memory device 100 according to an embodiment may determine that the customer company has prohibited access to the user data, and may prohibit provision of the user data and the key related thereto to the host 200.

Figure 11:
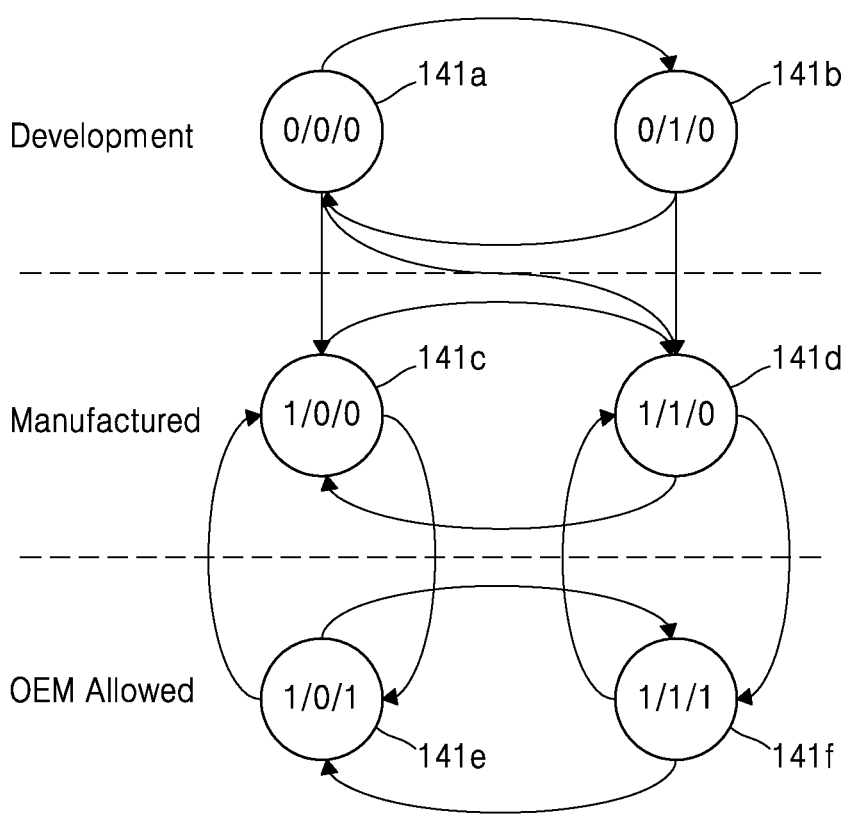
FIG. 11 is an embodiment in which a memory device is implemented according to values of a first field and a second field.

FIG. 11 is an embodiment in which the memory device 100 is implemented according to the values of the first field and the second field.

Referring to FIG. 11, first data 141*a* and 141*b* in the development stage of the memory device 100 according to an embodiment may have values of "0/0/0" and "0/1/0", respectively. The second bit according to an embodiment may include a value indicating whether the debug port 120 is activated. The memory device 100 according to an embodiment may allow provision of the user data and the key related thereto to the host 200, regardless of the value of the second bit in the development stage. Each of the first data 141*a* and 141*b* may convert the second bit, and activate the debug port 120.

Second data 141*c* and 141*d* in the manufacturing stage of the memory device 100 according to an embodiment may have values of "1/0/0" and "1/1/0", respectively. For example, when the first bit in the data value is changed to "1" in the development stage according to an embodiment, it may be determined that the memory device 100 has entered the manufacturing stage. In the manufacturing stage of the memory device 100 according to an embodiment, the first bit may be set to "1", and the second bit may be set to "0" or "1" depending on whether the debug port 120 is activated. The memory device 100 according to an embodiment may prohibit provision of the user data and the key related thereto to the host 200, regardless of the value of the second bit in the manufacturing stage. Each of the second data 141*c* and 141*d* may convert the second bit, and activate the debug port 120.

Third data 141*e* and 141*f* in the OEM allowance stage of the memory device 100 according to an embodiment may have values of "1/0/1" and "1/1/1", respectively. For example, when the third bit in the data value is changed to "1" in the OEM allowance stage according to an embodiment, it may be determined that the memory device 100 has entered the OEM allowance stage. In the OEM allowance stage of the memory device 100 according to an embodiment, the first bit may be set to "1", and the second bit may be set to "0" or "1" depending on whether the debug port 120 is activated. In addition, when the customer company allows access to the user data, the third bit may be set to "1". The memory device 100 according to an embodiment may allow provision of the user data and the key related thereto to the host 200 when the third bit is set to "1" in the OEM allowance stage. Each of the third data 141*e* and 141*f* may convert the second bit, and activate the debug port 120.

Figure 12:
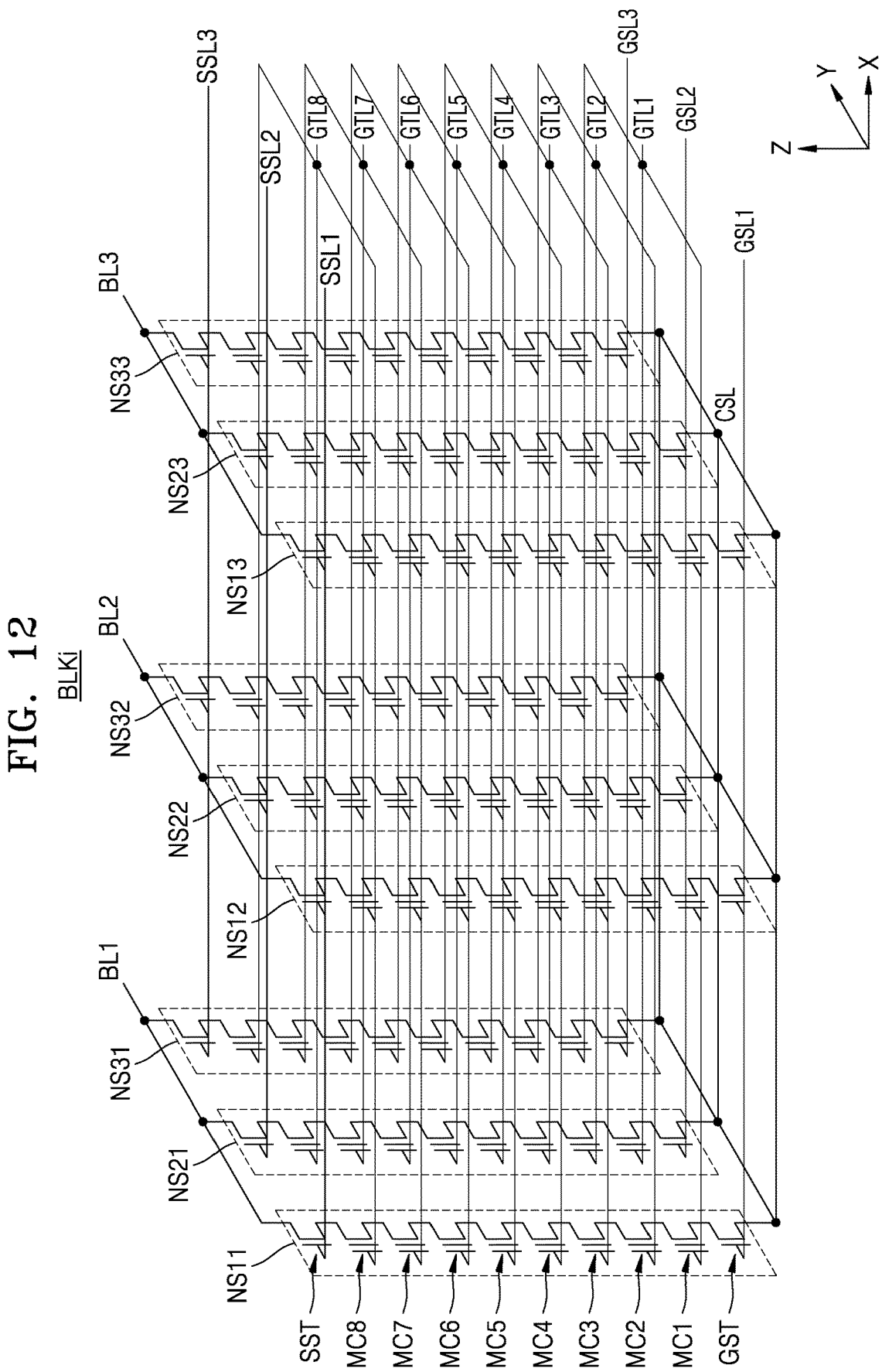
FIGS. 12 through 14 are diagrams of a three-dimensional V-NAND structure, which is applicable to a memory device, according to embodiments.
Figure 13:
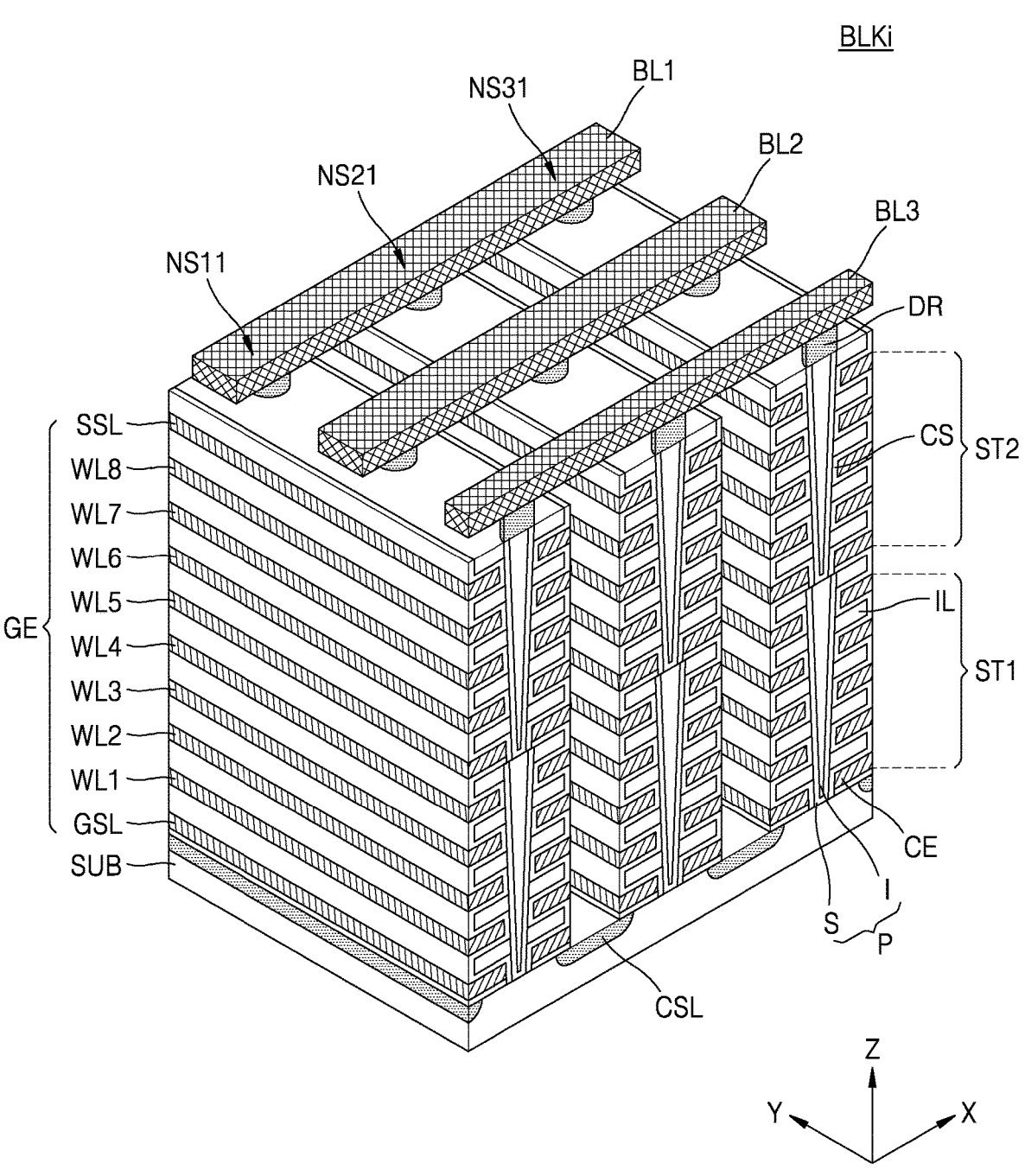
Figure 14:
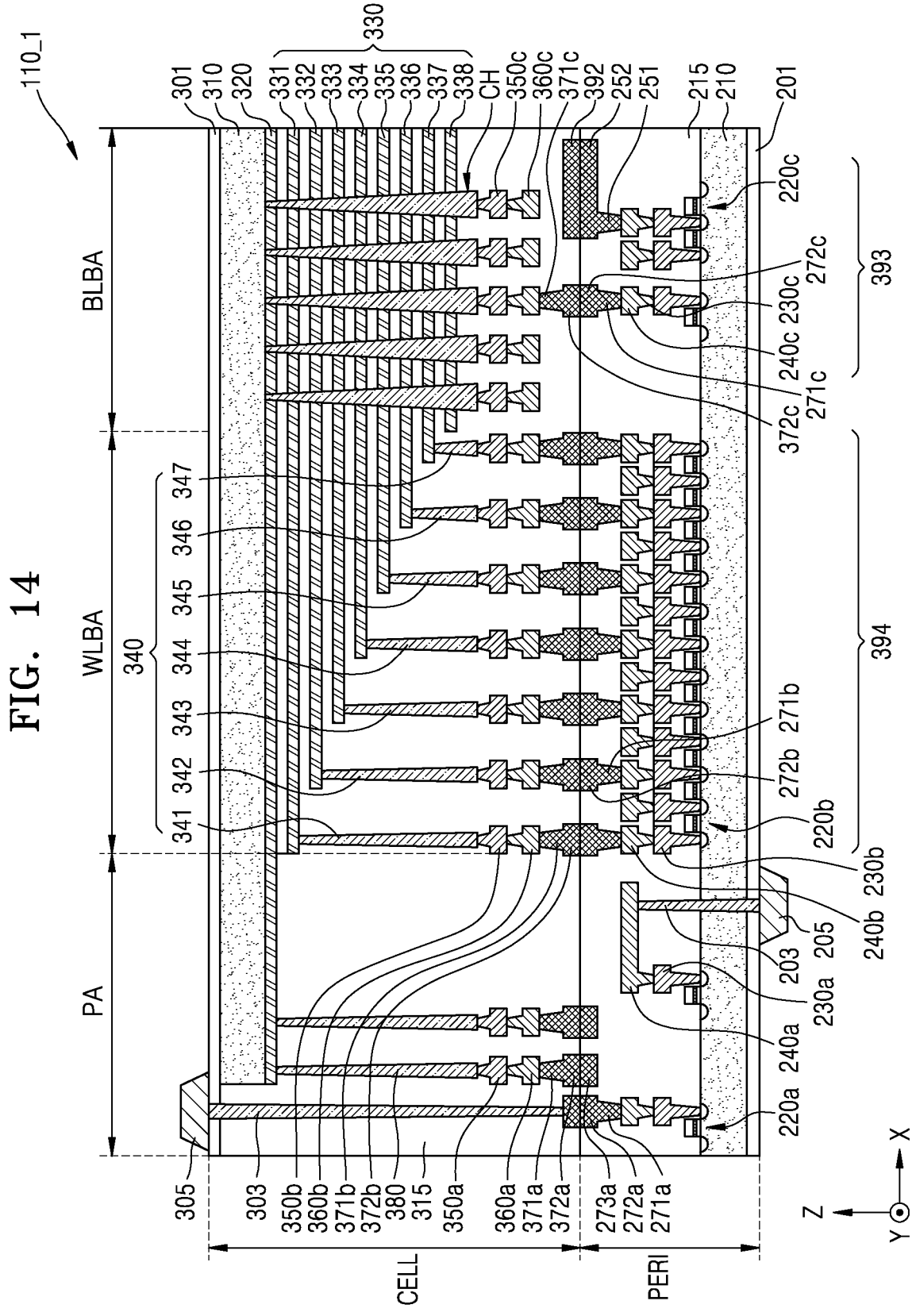

FIGS. 12 through 14 are diagrams of a three-dimensional V-NAND structure, which is applicable to the memory device 100, according to embodiments.

A first non-volatile memory 110_1 applicable to the memory device (refer to 100 in FIG. 1) may include a plurality of memory blocks. FIGS. 12 and 13 illustrate the structure of a memory block BLKi, which is any one of the plurality of memory blocks, and FIG. 14 illustrates an implementation of the non-volatile memory (refer to 110 in FIG. 1).

Referring to FIG. 12, the memory block BLKi may include a plurality of memory NAND strings NS11 through NS33 connected between bit lines BL1, BL2, and BL3 and a common source line CSL. Each of the plurality of memory NAND strings NS11 through NS33 may include a string selection transistor SST, a plurality of memory cells MC1 through MC8, and a ground selection transistor GST. For simplicity of the drawing, FIG. 10 illustrates that each of the plurality of memory NAND strings NS11 through NS33 includes eight memory cells MC1 through MC8, but is not limited thereto.

The string selection transistor SST may be connected to the string selection lines SSL1, SSL2, and SSL3 corresponding thereto. The plurality of memory cells MC1 through MC8 may be connected to gate lines GTL1 through GTL8 corresponding thereto, respectively. The gate lines GTL1 through GTL8 may correspond to word lines, and some of the gate lines GTL1 through GTL8 may correspond to dummy word lines. The ground selection transistor GST may be connected to ground selection lines GSL1, GSL2, and GSL3 corresponding thereto. The string selection transistor SST may be connected to bit lines BL1, BL2, and BL3 corresponding thereto, and the ground selection transistor GST may be connected to the common source line CSL.

Gate lines of the same height (for example, GTL1) may be commonly connected to each other, and the ground selection lines GSL1, GSL2, and GSL3 may be respectively separated from the string selection lines SSL1, SSL2, and SSL3. FIG. 10 illustrates that the memory block BLK is connected to eight gate lines GTL1 through GTL8 and three bit lines BL1, BL2, and BL3, but the embodiment is not limited thereto.

Referring further to FIG. 13, the memory block BLKi may be formed in a direction vertical to a substrate SUB.

Memory cells constituting the memory NAND strings NS11 through NS33 may be formed by being stacked on a plurality of semiconductor layers.

On the substrate SUB, the common source line CSL extending in a first direction (Y direction) may be provided. In a region of the substrate SUB between two adjacent common source lines CSL, a plurality of insulating layers IL, which extend in the first direction, may be sequentially provided in a third direction (Z direction), and the plurality of insulating layers IL may be apart from each other by a certain distance in the third direction (Z direction). In the region of the substrate SUB between the two adjacent common source lines CSL, a plurality of pillars P may be provided by being sequentially arranged in the first direction (Y direction) and penetrating the plurality of insulating layers IL in the third direction (Z direction). The plurality of pillars P may penetrate the plurality of insulating layers IL, and contact the substrate SUB. A surface layer S of each pillar P may include a silicon material doped with a first conductivity type, and may function as a channel region.

An inner layer I of each pillar P may include an insulating material such as silicon oxide or an air gap. In ae region between two adjacent common source lines CSL, a charge storage layer CS may be provided along exposed surfaces of the insulating layers IL, the pillars P, and the substrate SUB. The charge storage layer CS may include a gate insulating layer (or, referred to as a tunneling insulating layer), a charge trap layer, and a blocking insulating layer. In addition, in the region between two adjacent common source lines CSL, a gate electrode GE, such as the ground and string selection lines GSL and SSL, and the word lines WL1 through WL8, may be provided. Drains or drain contacts DR may be provided on each of the plurality of pillars P. On the drain contacts DR, the bit lines BL1, BL2, and BL3 extending in a second direction (X direction), and apart by a certain distance in the first direction (Y direction) may be provided.

As illustrated in FIG. 13, each of the memory NAND strings NS11 through NS33 may be implemented in a structure in which a first memory stack ST1 and a second memory stack ST2 are stacked. The first memory stack ST1 may be connected to the common source line CSL, the second memory stack ST2 may be connected to the bit lines BL1, BL2, and BL3, and the first memory stack ST1 and the second memory stack ST2 may be stacked to share a channel hole.

Referring to FIG. 14, the first non-volatile memory 110_1 may have a chip to chip (C2C) structure. The C2C structure may mean a structure, in which, after an upper chip including the cell region CELL is fabricated on a first wafer, and a lower chip including a periphery circuit region PERI is fabricated on a second wafer different from the first wafer, an upper chip and a lower chip are connected to each other by using a bonding method. For example, the bonding method may mean a method of electrically connecting a bonding metal formed on an uppermost metal layer of the upper chip to a bonding metal formed on an uppermost metal layer of the lower chip. For example, when the bonding metal includes copper (Cu), the bonding method may include a Cu-to-Cu bonding method, and the bonding metal may also include aluminum (Al) or tungsten (W).

Each of the periphery circuit region PERI and the cell region CELL of the first non-volatile memory 110_1 may include an external pad bonding area PA, a word line bonding area WLBA, and a bit line bonding area BLBA.

The periphery circuit region PERI may include a first substrate 210, an interlayer insulating layer 215, a plurality of circuit elements 220a, 220b, and 220c formed on the first substrate 210, and first metal layers 230a, 230b, and 230c respectively connected to the plurality of circuit elements 220a, 220b, and 220c, and second metal layers 240a, 240b, and 240c respectively formed on the first metal layers 230a, 230b, and 230c. In an example embodiment, the first metal layers 230a, 230b, and 230c may include W having a relatively high electrical specific resistance, and the second metal layers 240a, 240b, and 240c may include Cu having a relatively low electrical specific resistance.

In some embodiments, only the first metal layers 230a, 230b, and 230c and the second metal layers 240a, 240b, and 240c are illustrated and described, but the embodiment is not limited thereto, and at least one metal layer may be further formed on the second metal layers 240a, 240b, and 240c. At least some of the one or more metal layers formed on the second metal layers 240a, 240b, and 240c may include Al or the like having a lower electrical specific resistance than Cu, which forms the second metal layers 240a, 240b, and 240c.

The interlayer insulating layer 215 may be arranged on the first substrate 210 to cover the plurality of circuit elements 220a, 220b, and 220c, the first metal layers 230a, 230b, and 230c, and the second metal layers 240a, 240b, and 240c, and may include an insulating material, such as silicon oxide and silicon nitride.

Lower bonding metals 271b and 272b may be formed on the second metal layer 240b in the word line bonding area WLBA. In the word line bonding area WLBA, the lower bonding metals 271b and 272b in the periphery circuit region PERI may be electrically connected to upper bonding metals 371b and 372b in the cell region CELL by using a bonding method, and the lower bonding metals 271b and 272b and the upper bonding metals 371b and 372b may include Al, Cu, or W, etc.

The cell region CELL may provide at least one memory block. The cell region CELL may include a second substrate 310 and a common source line 320. On the second substrate 310, a plurality of word lines 331 through 338 (or comprehensively word lines 330) may be stacked in the third direction (Z direction) perpendicular to the upper surface of the second substrate 310. The string selection lines SSL1, SSL2, and SSL3 and the ground selection lines GSL1, GSL2, and GSL3 may be arranged on and under the plurality of word lines 330, respectively, and the plurality of word lines 330 may be arranged between the string selection lines SSL1, SSL2, and SSL3 and the ground selection lines GSL1, GSL2, and GSL3.

In the bit line bonding area BLBA, a channel structure CHS may extend in the third direction (Z direction) vertical to the upper surface of the second substrate 310, and penetrate the plurality of word lines 330, the string selection lines SSL1, SSL2, and SSL3, and the ground selection lines GSL1, GSL2, and GSL3. The channel structure CH may include a data storage layer, a channel layer, and a buried insulating layer, or the like, and the channel layer may be electrically connected to a first metal layer 850c and a second metal layer 860c. For example, the first metal layer 850c may include a bit line contact, and the second metal layer 860c may include a bit line. In an embodiment, the bit line 360c may extend in the first direction (Y direction) in parallel with the upper surface of the second substrate 310.

An area, in which the channel structure CH and the bit line 360c are arranged, may be defined as a bit line bonding area BLBA. The bit line 360c may be electrically connected to the circuit elements 220c providing a page buffer 393 in the periphery circuit region PERI in the bit line bonding area BLBA. For example, the bit line 360c may be connected to upper bonding metals 371c and 372c in the periphery circuit region PERI, and the upper bonding metals 371*c* and 372*c* may be respectively connected to lower bonding metals 271*c* and 272*c* connected to the circuit elements 220*c* of the page buffer 393.

In the word line bonding area WLBA, the plurality of word lines 330 may extend in the second direction (X direction) vertical to the first direction (Y direction) and in parallel with the upper surface of the second substrate 310, and may be connected to a plurality of cell contact plugs 341 through 347 (or comprehensively 340), respectively. The plurality of word lines 330 and the plurality of cell contact plugs 340 may be connected to each other on pads, which are provided by at least some of the plurality of word lines 330 extending with different lengths from each other in the second direction (X direction). A first metal layer 350*b* and a second metal layer 360*b* may be sequentially connected to an upper portion of the plurality of cell contact plugs 340 respectively connected to the plurality of word lines 330. In the word line bonding area WLBA, the plurality of cell contact plugs 340 may be connected to the periphery circuit region PERI via the upper bonding metals 371*b* and 372*b* in the cell region CELL and the lower bonding metals 271*b* and 272*b* in the periphery circuit region PERI.

The plurality of cell contact plugs 340 may be electrically connected to the circuit elements 220*b* providing a row decoder 394 in the periphery circuit region PERI. In an example embodiment, an operating voltage of the circuit elements 220*b* forming the row decoder 394 may be different from an operating voltage of the circuit elements 220*c* forming the page buffer 393. For example, the operating voltage of the circuit elements 220*c* forming the page buffer 393 may be greater than the operating voltage of the circuit elements 220*b* forming the row decoder 394.

A common source line contact plug 380 may be arranged in the external pad bonding area PA. The common source line contact plug 380 may include a conductive material, such as a metal, a metal compound, and polysilicon, and may be electrically connected to the common source line 320. A first metal layer 350*a* and a second metal layer 360*a* may be sequentially stacked on the common source line contact plug 380. For example, an area, in which the common source line contact plug 380, the first metal layer 350*a*, and the second metal layer 360*a* are arranged, may be defined as the external pad bonding area PA.

On the other hand, a first input/output (I/O) pad 205 and a second I/O pad 305 may be arranged in the external pad bonding area PA. A lower insulating layer 201 covering a lower surface of the first substrate 210 may be formed under the first substrate 210, and the first I/O pad 205 may be formed on the lower insulating layer 201. The first I/O pad 205 may be connected to at least one of the plurality of circuit elements 220*a*, 220*b*, and 220*c* in the periphery circuit region PERI via a first I/O contact plug 203, and may be separated from the first substrate 210 by the lower insulating layer 201. In addition, a side insulating layer may be arranged between the first I/O contact plug 203 and the first substrate 210, and may electrically separate the first I/O contact plug 203 from the first substrate 210.

An upper insulating layer 301 covering an upper surface of the second substrate 310 may be formed on the second substrate 310, and the second I/O pad 305 may be arranged on the upper insulating layer 301. The second I/O pad 305 may be connected to at least one of the plurality of circuit elements 220*a*, 220*b*, and 220*c* arranged in the periphery circuit region PERI via a second I/O contact plug 303. In an example embodiment, the second I/O pad 305 may be electrically connected to the circuit element 220*a*.

According to some embodiments, the second substrate 310, the common source line 320, or the like, may not be arranged in a region where the second I/O contact plug 303 is arranged. In addition, the second I/O pad 305 may not overlap the plurality of word lines 330 in the third direction (Z direction). The second I/O contact plug 303 may be separated from the second substrate 310 in a direction in parallel with the upper surface of the second substrate 310, may penetrate an interlayer insulating layer 315 in the cell region CELL, and be connected to the second I/O pad 305.

According to some embodiments, the first I/O pad 205 and the second I/O pad 305 may be selectively formed. For example, the non-volatile memory 110 may include only the first I/O pad 205 arranged on the first substrate 210, or may include only the second I/O pad 305 arranged on the second substrate 310. Alternatively, the non-volatile memory 110 may also include both the first I/O pad 205 and the second I/O pad 305.

In each of the external pad bonding area PA and the bit line bonding area BLBA, which are respectively included in the cell region CELL and the periphery circuit region PERI, a metal pattern of the uppermost metal layer may be arranged as a dummy pattern, or the uppermost metal layer may be empty.

In the external pad bonding area PA of the non-volatile memory 110, a lower metal pattern 273*a* having the same shape as an upper metal pattern 372*a* in the cell region CELL may be formed on the uppermost metal layer in the periphery circuit region PERI, in response to the upper metal pattern 372*a* formed on the uppermost metal layer in the cell region CELL. The lower metal pattern 273*a* formed on the uppermost metal layer in the periphery circuit region PERI may not be connected to a separate contact in the periphery circuit region PERI. Similarly to this case, in response to the lower metal pattern 273*a* formed on the uppermost metal layer of the periphery circuit region PERI in the external pad bonding area PA, an upper metal pattern having the same shape as the lower metal pattern 273*a* of the periphery circuit region PERI may also be formed on the uppermost metal layer of the cell region CELL.

The lower bonding metals 271*b* and 272*b* may be formed on the second metal layer 240*b* in the word line bonding area WLBA. In the word line bonding area WLBA, the lower bonding metals 271*b* and 272*b* of the periphery circuit region PERI may be electrically connected to the upper bonding metals 371*b* and 372*b* of the cell region CELL by using a bonding method, respectively.

In addition, in the bit line bonding area BLBA, in response to a lower metal pattern 252 formed on the uppermost metal layer in the periphery circuit region PERI, an upper metal pattern 392 having the same shape as the lower metal pattern 252 in the periphery circuit region PERI may be formed on the uppermost metal layer of the cell region CELL. A contact may not be formed on the upper metal pattern 392, which is formed on the lowermost metal layer in the cell region CELL.

The following claims are not limited in scope to the embodiments.

Various changes in form and details may be made to the embodiments without departing from the spirit and scope of the following claims.

What is claimed is:
1. A memory device comprising:
one or more non-volatile memories configured to store user data and at least one key related to the user data;

19 a network-on-chip comprising a bus manager configured to manage access to the user data and the at least one key; and a debug port directly connected to a host and configured to receive a request from the host, wherein the bus manager is further configured to, based on the debug port being activated, determine whether to allow access of the host to the user data and the at least one key based on classification information, and wherein the classification information comprises:

a first field indicating whether a present stage of the memory device is in a pre-manufacturing stage or in a post-manufacturing stage; and a second field indicating whether to allow access of a manufacturer to the at least one key.

2. The memory device of claim 1, wherein the bus manager is further configured to determine, based on a value of the first field, whether to allow access of the host, which corresponds to a manufacturer, to the user data and the at least one key.

3. The memory device of claim 2, wherein the bus manager is further configured to, based on a value of the first field indicating the pre-manufacturing stage, allow access of the host to the user data and the at least one key.

4. The memory device of claim 2, wherein the bus manager is further configured to, based on a value of the first field indicating the post-manufacturing stage, determine whether to allow access of the host to the user data and the at least one key based on a value of the second field.

5. The memory device of claim 4, wherein the bus manager is further configured to, based on the value of the second field comprising a first value indicating an allowance of access of the manufacturer to the at least one key, allow access of the host to the user data and the at least one key.

6. The memory device of claim 1, wherein the bus manager is further configured to, based on a value of the first field indicating the pre-manufacturing stage, allow access of the host to the user data and the at least one key.

7. The memory device of claim 1, wherein the bus manager is further configured to, based on a value of the first field indicating the post-manufacturing stage, manage access of the host to the user data and the at least one key based on the value of the second field.

8. The memory device of claim 1, wherein the at least one key comprises a preset data encryption key or a root key for the preset data encryption key.

9. The memory device of claim 1, wherein the bus manager is further configured to, based on a self-encryption operation on the user data being not supported, disconnect a connection of a data bus to the one or more non-volatile memories.

10. An operating method of a memory device, the operating method comprising:

storing user data and at least one key related to the user data;

managing access to the user data and the at least one key; and receiving a request from a host, wherein the managing the access to the user data and the at least one key comprises, based on a debug port being activated, determining whether to allow access of the host to the user data and the at least one key based on classification information, and wherein the classification information comprises:

a first field indicating whether a present stage of the memory device is in a pre-manufacturing stage or in a post-manufacturing stage; and a second field indicating whether to allow access of a manufacturer to the at least one key.

11. The operating method of claim 10, wherein the managing the access to the user data and the at least one key further comprises determining whether to allow access of the host to the user data and the at least one key based on a first value of the first field.

12. The operating method of claim 11, wherein the managing the access to the user data and the at least one key further comprises, based on a value of the first field comprising a first value indicating the pre-manufacturing stage, allowing access of the host to the user data and the at least one key.

13. The operating method of claim 11, wherein the managing the access to the user data and the at least one key further comprises, based on a value of the first field indicating the post-manufacturing stage, determining whether to allow access of the host to the user data and the at least one key based on a second value of the second field.

14. The operating method of claim 13, wherein the managing the access to the user data and the at least one key further comprises, based on a value of the second field comprising a first value indicating an allowance of access of the manufacturer to the at least one key, allowing access of the host to the user data and the at least one key.

15. The operating method of claim 11, wherein the managing the access to the user data and the at least one key further comprises, based on a value of the first field of the classification information indicating the post-manufacturing stage, managing an access of the host to the user data and the at least one key based on the value of the second field.

16. The operating method of claim 10, wherein the managing the access to the user data and the at least one key further comprises storing the classification information.

17. The operating method of claim 16, wherein the managing the access to the user data and the at least one key further comprises, based on a value of the first field indicates the pre-manufacturing stage, allowing access of the host to the user data and the at least one key.

18. The operating method of claim 10, wherein the managing the access to the user data and the at least one key further comprises, when a self-encryption operation on the user data is not supported, disconnecting connection of a data bus to a non-volatile memory.

19. A memory system comprising:

a memory device configured to store user data; and a host configured to diagnose an error of the memory device;

wherein the memory device comprises:

one or more non-volatile memories configured to store user data and at least one key related to the user data;

a network-on-chip comprising a bus manager configured to manage access to the user data and the at least one key; and a debug port directly connected to the host and configured to receive a request from the host, wherein the bus manager is further configured to, based on the debug port being activated, determine whether to allow access of the host to the user data and the at least one key based on classification information, and wherein the classification information comprises:

a first field indicating whether a present stage of the memory device is in a pre-manufacturing stage or in a post-manufacturing stage; and a second field indicating whether to allow access of a manufacturer to the at least one key.

* * * * *